United States Patent
Sadek et al.

(10) Patent No.: US 10,582,458 B2
(45) Date of Patent: Mar. 3, 2020

(54) LISTEN BEFORE TALK DESIGN FOR SPECTRUM SHARING IN NEW RADIO (NR)

(71) Applicant: QUALCOMM Incorporated, San Diego, CA (US)

(72) Inventors: Ahmed Kamel Sadek, San Diego, CA (US); Naga Bhushan, San Diego, CA (US); Peter Black, San Diego, CA (US); Michael Mingxi Fan, San Diego, CA (US); Yongbin Wei, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 153 days.

(21) Appl. No.: 15/460,137

(22) Filed: Mar. 15, 2017

(65) Prior Publication Data

US 2018/0063799 A1 Mar. 1, 2018

Related U.S. Application Data

(60) Provisional application No. 62/382,645, filed on Sep. 1, 2016.

(51) Int. Cl.
| | |
|---|---|
| *H04W 52/36* | (2009.01) |
| *H04W 74/08* | (2009.01) |
| *H04W 74/00* | (2009.01) |
| *H04W 52/34* | (2009.01) |
| *H04W 72/10* | (2009.01) |

(52) U.S. Cl.
CPC ......... *H04W 52/367* (2013.01); *H04W 52/34* (2013.01); *H04W 72/10* (2013.01); *H04W 74/002* (2013.01); *H04W 74/0808* (2013.01); *H04W 74/0816* (2013.01)

(58) Field of Classification Search
None
See application file for complete search history.

(56) References Cited

U.S. PATENT DOCUMENTS

| | | | |
|---|---|---|---|
| 8,483,620 B2 | 7/2013 | Horn et al. | |
| 2004/0264423 A1* | 12/2004 | Ginzburg | H04W 74/0816 370/338 |
| 2005/0136921 A1 | 6/2005 | Stephens | |

(Continued)

FOREIGN PATENT DOCUMENTS

WO WO-2009100036 A2 8/2009

OTHER PUBLICATIONS

ISA/EP, International Search Report and Written Opinion of the International Searching Authority, Int'l Application No. PCT/US2017/046524, dated Oct. 27, 2017, European Patent Office, Rijswijk, NL, 13 pgs.

(Continued)

*Primary Examiner* — Michael J Moore, Jr.
(74) *Attorney, Agent, or Firm* — Holland & Hart LLP

(57) ABSTRACT

Methods, systems, and devices for wireless communication are described. A wireless node may receive stress beacons on a channel. Each stress beacon may include an indication of an allowable interference level for a corresponding wireless node that transmitted the stress beacon on the channel. The wireless node may update a backoff window for the channel based on the allowable interference levels indicated in the stress beacons.

24 Claims, 13 Drawing Sheets

(56) References Cited

U.S. PATENT DOCUMENTS

| | | | |
|---|---|---|---|
| 2007/0105575 A1* | 5/2007 | Sampath | H04W 52/243 |
| | | | 455/509 |
| 2007/0230378 A1* | 10/2007 | Tavares | H04W 52/0219 |
| | | | 370/310 |
| 2012/0002567 A1* | 1/2012 | Sun | H04W 28/16 |
| | | | 370/252 |
| 2014/0036805 A1 | 2/2014 | Sadek et al. | |
| 2016/0174163 A1* | 6/2016 | Emmanuel | H04B 17/336 |
| | | | 370/329 |
| 2016/0278088 A1* | 9/2016 | Cheng | H04L 47/27 |
| 2017/0019909 A1* | 1/2017 | Si | H04L 47/27 |
| 2017/0055296 A1* | 2/2017 | Cheng | H04W 74/0841 |
| 2017/0156161 A1* | 6/2017 | Kang | H04W 74/0808 |
| 2017/0339721 A1* | 11/2017 | Mukherjee | H04W 16/14 |
| 2018/0124807 A1* | 5/2018 | Smith | H04W 16/14 |
| 2018/0235005 A1* | 8/2018 | Ansari | H04W 74/0808 |
| 2019/0045547 A1* | 2/2019 | Lalam | H04W 52/36 |

OTHER PUBLICATIONS

LG Electronics, "LBT Schemes in LAA UL," 3GPP TSG RAN WG1 Meeting #84, R1-160630, St, Julian's, Malta, Feb. 15-9, 2016, 10 pgs., XP051053959, 3rd Generation Partnership Project.

\* cited by examiner

LISTEN BEFORE TALK DESIGN FOR SPECTRUM SHARING IN NEW RADIO (NR)

CROSS REFERENCES

The present application for patent claims priority to U.S. Provisional Patent Application No. 62/382,645 by Sadek, et al., entitled "New Radio Listen Before Talk Design For Spectrum Sharing," filed Sep. 1, 2016, assigned to the assignee hereof.

INTRODUCTION

The following relates generally to wireless communication, and more specifically to New Radio (NR) listen-before-talk (LBT) procedures for spectrum sharing.

Wireless communication systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems. A wireless multiple-access communications system may include a number of base stations, each simultaneously supporting communication for multiple communication devices, which may be otherwise known as user equipment (UE).

Certain wireless multiple-access communication systems may employ a LBT process for channel access. The LBT process may include a wireless node, e.g., a UE and/or a base station, that listens on a channel to determine whether the channel is busy. For example, the wireless node may detect an energy level present on the channel and determine that the channel is occupied or busy when the energy level is above a threshold. When the channel is determined to be busy, the wireless node will conventionally start a backoff window (e.g., a contention window (CW)) that is generally a time period in which the wireless node waits to attempt to access the channel again. Thus, conventional techniques provide for a wireless node to set its own backoff window based on the amount of signal that it detects on the channel.

SUMMARY

Aspects of the present disclosure provide for a transmitting node to perform a backoff procedure based on the interference caused by the transmitting node with respect to other wireless nodes, e.g., rather than the interference experienced by the receiver of the transmitting node. In one example, the transmitting node may receive stress beacons from other wireless nodes. The stress beacons may convey an indication of attribute(s) of another wireless node, such as how much interference the other wireless nodes are experiencing and/or how much interference the other wireless nodes can tolerate. The transmitting node may use the stress beacons it receives from the other wireless nodes to determine its own backoff window to minimize or control the interference caused to the other wireless nodes. Stress beacons may be generated by any wireless node, e.g., based on a signal level detected on the channel, in order to convey the indication of the attribute to other wireless nodes. In some aspects, a wireless node may determine that certain channels have a backoff window that is higher than a threshold level, e.g., have a long backoff window. This may indicate that these channels have associated high interference and/or traffic levels. The wireless node may deprioritize those channels having a high backoff window.

A method of wireless communication is described. The method may include receiving one or more stress beacons on a channel, each of the one or more stress beacons comprising an indication of an attribute for a corresponding wireless node on the channel and updating a backoff window for the channel based at least in part on the attribute indicated by the respective one or more stress beacons.

An apparatus for wireless communication is described. The apparatus may include means for receiving one or more stress beacons on a channel, each of the one or more stress beacons comprising an indication of an attribute for a corresponding wireless node on the channel and means for updating a backoff window for the channel based at least in part on the attribute indicated by the respective one or more stress beacons.

Another apparatus for wireless communication is described. The apparatus may include a processor, memory in electronic communication with the processor, and instructions stored in the memory. The instructions may be operable to cause the processor to receive one or more stress beacons on a channel, each of the one or more stress beacons comprising an indication of an attribute for a corresponding wireless node on the channel and update a backoff window for the channel based at least in part on the attribute indicated by the respective one or more stress beacons.

A non-transitory computer readable medium for wireless communication is described. The non-transitory computer-readable medium may include instructions operable to cause a processor to receive one or more stress beacons on a channel, each of the one or more stress beacons comprising an indication of an attribute for a corresponding wireless node on the channel and update a backoff window for the channel based at least in part on the attribute indicated by the respective one or more stress beacons.

Some examples of the method, apparatus, and non-transitory computer-readable medium described above may further include processes, features, means, or instructions for updating the backoff window for the channel based at least in part on the one or more stress beacons. Some examples of the method, apparatus, and non-transitory computer-readable medium described above may further include processes, features, means, or instructions for updating the backoff window for the channel based at least in part on one or more of an acknowledgement/negative-acknowledgement (ACK/NACK) feedback message, a channel quality information (CQI) feedback message, a measurement report provided by a network listen module, or combinations thereof.

Some examples of the method, apparatus, and non-transitory computer-readable medium described above may further include processes, features, means, or instructions for identifying a backoff transmit power level based at least in part on the attribute indicated by the respective one or more stress beacons. Some examples of the method, apparatus, and non-transitory computer-readable medium described above may further include processes, features, means, or instructions for adjusting a transmit power based at least in part on the backoff transmit power level.

Some examples of the method, apparatus, and non-transitory computer-readable medium described above may further include processes, features, means, or instructions for identifying a pathloss value associated with the respective one or more stress beacons. Some examples of the method, apparatus, and non-transitory computer-readable medium described above may further include processes, features, means, or instructions for identifying the backoff transmit power level based at least in part on the pathloss value.

Some examples of the method, apparatus, and non-transitory computer-readable medium described above may further include processes, features, means, or instructions for determining that the backoff transmit power level may be above a threshold level. Some examples of the method, apparatus, and non-transitory computer-readable medium described above may further include processes, features, means, or instructions for utilizing a time division multiplexing scheme for subsequent transmissions.

Some examples of the method, apparatus, and non-transitory computer-readable medium described above may further include processes, features, means, or instructions for identifying a stress beacon count indicative of a number of the one or more stress beacons received on the channel. Some examples of the method, apparatus, and non-transitory computer-readable medium described above may further include processes, features, means, or instructions for updating the backoff window based at least in part on the stress beacon count.

In some examples of the method, apparatus, and non-transitory computer-readable medium described above, the allowable interference levels indicated by the one or more stress beacons may be associated with one or more prior transmissions.

Some examples of the method, apparatus, and non-transitory computer-readable medium described above may further include processes, features, means, or instructions for identifying a total network count associated with one or more detected networks. Some examples of the method, apparatus, and non-transitory computer-readable medium described above may further include processes, features, means, or instructions for updating the backoff window based at least in part on the total network count.

Some examples of the method, apparatus, and non-transitory computer-readable medium described above may further include processes, features, means, or instructions for receiving a subsequent stress beacon during a backoff window period. Some examples of the method, apparatus, and non-transitory computer-readable medium described above may further include processes, features, means, or instructions for pausing the backoff window. Some examples of the method, apparatus, and non-transitory computer-readable medium described above may further include processes, features, means, or instructions for updating the backoff window based at least in part on the indication in the subsequent stress beacon of the attribute for the corresponding wireless node. Some examples of the method, apparatus, and non-transitory computer-readable medium described above may further include processes, features, means, or instructions for resuming the backoff window period according to the updated backoff window.

Some examples of the method, apparatus, and non-transitory computer-readable medium described above may further include processes, features, means, or instructions for determining, based at least in part on the backoff window, whether to perform one or more of a power backoff operation, a transmission blanking procedure, or a beamforming transmission.

Some examples of the method, apparatus, and non-transitory computer-readable medium described above may further include processes, features, means, or instructions for transmitting a trigger message to initiate receipt of the one or more stress beacons.

In some examples of the method, apparatus, and non-transitory computer-readable medium described above, the trigger message comprises an enhanced request to send (eRTS) message. In some examples of the method, apparatus, and non-transitory computer-readable medium described above, the one or more stress beacons comprise an enhanced clear to send (eCTS) message. In some examples of the method, apparatus, and non-transitory computer-readable medium described above, the attribute comprises an allowable interference level associated with the corresponding wireless nodes.

A method of wireless communication is described. The method may include maintaining a backoff window for each channel of a set of channels, identifying a subset of channels from the set of channels, each channel of the subset of channels having a corresponding backoff window above a threshold level, and deprioritizing the subset of channels such that each channel of the subset of channels is assigned a priority that is lower than channels having a corresponding backoff window below the threshold level.

An apparatus for wireless communication is described. The apparatus may include means for maintaining a backoff window for each channel of a set of channels, means for identifying a subset of channels from the set of channels, each channel of the subset of channels having a corresponding backoff window above a threshold level, and means for deprioritizing the subset of channels such that each channel of the subset of channels is assigned a priority that is lower than channels having a corresponding backoff window below the threshold level.

Another apparatus for wireless communication is described. The apparatus may include a processor, memory in electronic communication with the processor, and instructions stored in the memory. The instructions may be operable to cause the processor to maintain a backoff window for each channel of a set of channels, identify a subset of channels from the set of channels, each channel of the subset of channels having a corresponding backoff window above a threshold level, and deprioritize the subset of channels such that each channel of the subset of channels is assigned a priority that is lower than channels having a corresponding backoff window below the threshold level.

A non-transitory computer readable medium for wireless communication is described. The non-transitory computer-readable medium may include instructions operable to cause a processor to maintain a backoff window for each channel of a set of channels, identify a subset of channels from the set of channels, each channel of the subset of channels having a corresponding backoff window above a threshold level, and deprioritize the subset of channels such that each channel of the subset of channels is assigned a priority that is lower than channels having a corresponding backoff window below the threshold level.

Some examples of the method, apparatus, and non-transitory computer-readable medium described above may further include processes, features, means, or instructions for updating the backoff window for each channel of the set of channels based at least in part on receiving one or more stress beacons on the channel. Some examples of the method, apparatus, and non-transitory computer-readable medium described above may further include processes, features, means, or instructions for updating the backoff window for each channel of the set of channels based at least in part on one or more of an ACK/NACK feedback message received on the channel, a CQI feedback message received on the channel, a measurement report provided by a network listen module on the channel, or combinations thereof.

Some examples of the method, apparatus, and non-transitory computer-readable medium described above may further include processes, features, means, or instructions for determining that the subset of channels includes at least a predetermined number of channels. Some examples of the method, apparatus, and non-transitory computer-readable medium described above may further include processes, features, means, or instructions for selecting a random subset of channels of the set of channels. Some examples of the method, apparatus, and non-transitory computer-readable medium described above may further include processes, features, means, or instructions for resetting, to a predetermined minimum value, the corresponding backoff windows for each of the random subset of channels.

Some examples of the method, apparatus, and non-transitory computer-readable medium described above may further include processes, features, means, or instructions for selecting the random subset of channels of the set of channels based at least in part on an identity field.

A method of wireless communication is described. The method may include determining whether an identified channel interference level is above a threshold, configuring a stress beacon based at least in part on the determination of whether the identified channel interference level is above the threshold level, and transmitting the configured stress beacon, the stress beacon comprising an indication of an attribute.

An apparatus for wireless communication is described. The apparatus may include means for determining whether an identified channel interference level is above a threshold, means for configuring a stress beacon based at least in part on the determination of whether the identified channel interference level is above the threshold level, and means for transmitting the configured stress beacon, the stress beacon comprising an indication of an attribute.

Another apparatus for wireless communication is described. The apparatus may include a processor, memory in electronic communication with the processor, and instructions stored in the memory. The instructions may be operable to cause the processor to determine whether an identified channel interference level is above a threshold, configure a stress beacon based at least in part on the determination of whether the identified channel interference level is above the threshold level, wherein the configured stress beacon comprises a duration field, and transmit the configured stress beacon, the stress beacon comprising an indication of an attribute.

A non-transitory computer readable medium for wireless communication is described. The non-transitory computer-readable medium may include instructions operable to cause a processor to determine whether an identified channel interference level is above a threshold, configure a stress beacon based at least in part on the determination of whether the identified channel interference level is above the threshold level, wherein the configured stress beacon comprises a duration field, and transmit the configured stress beacon, the stress beacon comprising an indication of an attribute.

In some examples of the method, apparatus, and non-transitory computer-readable medium described above, determining whether the identified channel interference level may be above the threshold comprises: determining a signal to interference-plus-noise ratio (SINR) for a channel corresponding to the identified channel interference level. Some examples of the method, apparatus, and non-transitory computer-readable medium described above may further include processes, features, means, or instructions for determining that the SINR for the channel may be less than an SINR threshold.

Some examples of the method, apparatus, and non-transitory computer-readable medium described above may further include processes, features, means, or instructions for receiving a trigger message from a transmitting node, the trigger message operative to trigger transmission of the stress beacon.

In some examples of the method, apparatus, and non-transitory computer-readable medium described above, receiving the trigger message comprises: receiving an eRTS message. In some examples of the method, apparatus, and non-transitory computer-readable medium described above, configuring the stress beacon comprises: configuring a reference signal to be transmitted at a predetermined power level.

In some examples of the method, apparatus, and non-transitory computer-readable medium described above, configuring the stress beacon comprises: including a duration field within the stress beacon. Some examples of the method, apparatus, and non-transitory computer-readable medium described above may further include processes, features, means, or instructions for selecting a value of the duration field to convey an indication of the attribute.

Some examples of the method, apparatus, and non-transitory computer-readable medium described above may further include processes, features, means, or instructions for selecting a value of zero for the duration field to convey an indication that no transmission may be allowed. Some examples of the method, apparatus, and non-transitory computer-readable medium described above may further include processes, features, means, or instructions for broadcasting the stress beacon.

Some examples of the method, apparatus, and non-transitory computer-readable medium described above may further include processes, features, means, or instructions for calculating the attribute as a function of carrier to interference power.

In some examples of the method, apparatus, and non-transitory computer-readable medium described above, the carrier to interference power may be based at least in part on one or more stress beacons received from other wireless nodes. In some examples of the method, apparatus, and non-transitory computer-readable medium described above, the stress beacon comprises an eCTS message. In some examples of the method, apparatus, and non-transitory computer-readable medium described above, the attribute comprises an allowable interference level associated with the corresponding wireless nodes.

DETAILED DESCRIPTION

Aspects of the disclosure are initially described in the context of a wireless communication system. Aspects of the disclosure relate to an improved LBT design. Conventional LBT procedures typically include a wireless node adjusting its own backoff window based on the amount of energy detected on a channel and/or the ACK/NACK feedback for its own transmitted packets as a proxy for collisions. Aspects of the present disclosure provide for a transmitting node to perform a backoff procedure based on how much the transmitting node interferes with other wireless nodes, e.g., rather than how much the receiver of the transmitting node is being interfered with. For example, the transmitting node may receive stress beacons from other wireless nodes that convey an indication of attribute(s) of the other wireless nodes, such as how much interference the other wireless nodes are experiencing and/or how much interference the other wireless nodes can tolerate. The transmitting node may use the stress beacons it receives from the other wireless nodes to determine its own backoff window to minimize or control the interference caused to the other wireless nodes. In some aspects, wireless nodes may determine an amount of interference that is detected on a channel, e.g., based on the signal level detected on the channel, based on the SINR of the wireless node, etc. The wireless nodes configure respective stress beacons to convey the indication of the allowable interference level and also transmit the respective stress beacons, e.g., broadcast the stress beacons.

In some aspects, the disclosure provides for a learning algorithm that favors contention on channels (e.g., subbands) with a lower backoff window. For example, a wireless node may maintain a backoff window for each channel that the wireless node may communicate on. The wireless node may determine that certain channels have a backoff window that is higher than a threshold level, e.g., have a long backoff window. This may indicate that these channels have associated high interference and/or traffic levels. The wireless node may deprioritize those channels having a high backoff window. This may support the wireless node selecting low interference or underutilized channels to improve frequency reuse.

Aspects of the disclosure are further illustrated by and described with reference to apparatus diagrams, system diagrams, and flowcharts that relate to NR LBT procedures for spectrum sharing.

Figure 1:
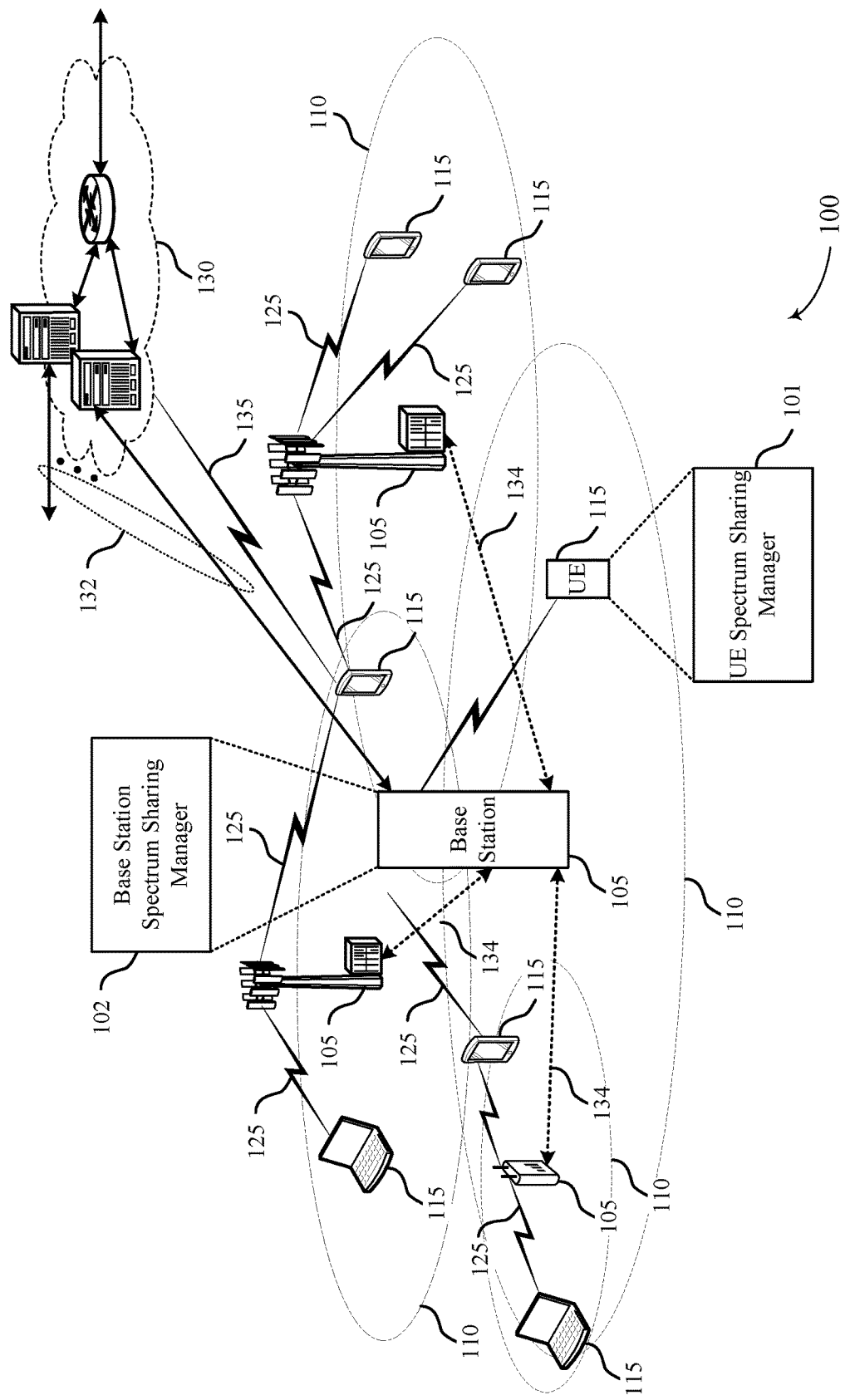
FIG. 1 illustrates an example of a system for wireless communication that supports NR LBT procedures for spectrum sharing, in accordance with one or more aspects of the present disclosure.

FIG. 1 illustrates an example of a wireless communication system 100, in accordance with one or more aspects of the present disclosure. The wireless communication system 100 may include base stations 105 (e.g., gNodeBs (gNBs)), UEs 115, and a core network 130. Wireless communication system 100 may support dynamic reception opportunity (RO) and transmit opportunity (TO) configurations to enable reduced latency and reduced power consumption. For example, wireless communication system 100 may support a TO following the reception of data during the on duration of a discontinuous reception (DRX) configuration. Additionally or alternatively, a subsequent RO may follow the transmission of data during the on duration of a discontinuous transmission (DTX) configuration.

The core network 130 may provide user authentication, access authorization, tracking, Internet Protocol (IP) connectivity, and other access, routing, or mobility functions. At least some of the base stations 105 (e.g., network device, which may be an example of an evolved node B (eNB), or a gNB, or an access node controller (ANC)) may interface with the core network 130 through backhaul links 132 (e.g., S1, S2, etc.) and may perform radio configuration and scheduling for communication with the UEs 115. In various examples, the base stations 105 may communicate, either directly or indirectly (e.g., through core network 130), with each other over backhaul links 134 (e.g., X1, X2, etc.), which may be wired or wireless communication links.

Each base station 105 may also communicate with a number of UEs 115 through a number of other base stations 105, which may be an example of a smart radio head. In alternative configurations, various functions of each base station 105 may be distributed across various base stations 105 (e.g., radio heads and access network controllers) or consolidated into a single base station 105. UEs 115 may also communicate with the core network 130 through communication link 135.

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use Hybrid ARQ (HARD) to provide retransmission at the MAC layer to improve link efficiency. In the control plane, the Radio Resource Control (RRC) protocol layer may provide establishment, configuration, and maintenance of an RRC connection between a UE 115 and a base station 105, network device, or core network 130 supporting radio bearers for user plane data. At the Physical (PHY) layer, transport channels may be mapped to physical channels.

The UEs 115 may be dispersed throughout the wireless communication system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, a wireless node, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, an internet of everything (IoE) device, or the like. A UE 115 may be able to communicate with various types of base stations 105, network devices, access points, or other base stations 105, including macro eNBs, small cell eNBs, relay base stations, and the like. A UE 115 may also be able to communicate directly with other UEs (e.g., using a peer-to-peer (P2P) protocol).

The communication links 125 shown in wireless communication system 100 may include uplink (UL) channels from a UE 115 to a base station 105, and/or DL channels, from a base station 105 to a UE 115. The downlink channels may also be called forward link channels, while the uplink channels may also be called reverse link channels. Control information and data may be multiplexed on an uplink channel or downlink according to various techniques. Control information and data may be multiplexed on a downlink channel, for example, using time-division multiplexing (TDM) techniques, frequency-division multiplexing (FDM) techniques, or hybrid TDM-FDM techniques. In some examples, the control information transmitted during a transmit time interval (TTI) of a downlink channel may be distributed between different control regions in a cascaded manner (e.g., between a common control region and one or more UE-specific control regions).

UEs 115 and base stations 105 may each be considered a wireless node of wireless communication system 100. UEs 115 may include a UE spectrum sharing manager 101 and base stations 105 may include a base station spectrum sharing manager 102, which may support one or more aspects of the described NR-LBT design for spectrum sharing. For example, each or both of the UE spectrum sharing manager 101 and the base station spectrum sharing manager 102 may be configured to receive stress beacon(s) on a channel. The stress beacon(s) may provide an indication of an attribute, such as the allowable interference level for a corresponding wireless node that transmitted the stress beacon. Each or both of the UE spectrum sharing manager 101 and the base station spectrum sharing manager 102 may be configured to update a backoff window for the channel based on the allowable interference level indicated in the stress beacon(s) received from the other wireless node.

In some aspects, each or both of the UE spectrum sharing manager 101 and the base station spectrum sharing manager 102 may be configured to maintain a backoff window for each channel of a set of channels, e.g., for each channel the UE 115 and/or base station 105 supports communication on. Each or both of the UE spectrum sharing manager 101 and the base station spectrum sharing manager 102 may be configured to identify channels that have a backoff window above a threshold level, e.g., a subset of channels. Each or both of the UE spectrum sharing manager 101 and the base station spectrum sharing manager 102 may be configured to deprioritize the channels having the high backoff window level by assigning a low priority level to those channels. Thus, channels having shorter backoff windows (and therefore lower levels of interference) may be favored to promote frequency reuse.

In some aspects, each or both of the UE spectrum sharing manager 101 and the base station spectrum sharing manager 102 may be configured to determine interference on a channel. Each or both of the UE spectrum sharing manager 101 and the base station spectrum sharing manager 102 may be configured to configure a stress beacon based on the channel interference level and transmit the stress beacon. The stress beacon may carry an indication of an allowable interference level.

Wireless communication system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

In some cases, wireless communication system 100 may utilize both licensed and unlicensed radio frequency spectrum bands. For example, wireless communication system 100 may employ Long Term Evolution (LTE) License Assisted Access (LTE-LAA) or LTE Unlicensed (LTE U) radio access technology (RAT) in an unlicensed band such as the 5 Ghz Industrial, Scientific, and Medical (ISM) band. When operating in unlicensed radio frequency spectrum bands, wireless devices such as base stations 105 and UEs 115 may employ LBT procedures to ensure the channel is clear before transmitting data. These devices may perform an LBT procedure such as a clear channel assessment (CCA) prior to communicating in order to determine whether the channel is available. In some cases, operations in unlicensed bands may be based on a CA configuration in conjunction with CCs operating in a licensed band. Operations in unlicensed spectrum may include downlink transmissions, uplink transmissions, or both. Duplexing in unlicensed spectrum may be based on FDD, TDD, or a combination of both.

In some cases, wireless communication system may utilize different portions of the radio frequency spectrum band for aspect of the described NR LBT for spectrum sharing. In some examples, wireless communication system 100 may utilize one or more of an unlicensed spectrum, a licensed spectrum, a lightly licensed spectrum, licensed assisted access (e.g., licensed plus unlicensed spectrum), sub-6 GHz spectrum, and/or millimeter-wave (mmW) spectrum.

In some cases, wireless communication system 100 may utilize enhanced component carriers (eCCs). An eCC may be characterized by one or more features including: wider bandwidth, shorter symbol duration, shorter TTIs, and modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). An eCC characterized by wide bandwidth may include one or more segments that may be utilized by UEs 115 that are not capable of monitoring the whole bandwidth or prefer to use a limited bandwidth (e.g., to conserve power).

In some cases, an eCC may utilize a different symbol duration than other CCs, which may include use of a reduced symbol duration as compared with symbol durations of the other CCs. A shorter symbol duration is associated with increased subcarrier spacing. A device, such as a UE 115 or base station 105, utilizing eCCs may transmit wideband signals (e.g., 20, 40, 60, 80 MHz., etc.) at reduced symbol durations (e.g., 16.67 microseconds). A TTI in eCC may consist of one or multiple symbols. In some cases, the TTI duration (that is, the number of symbols in a TTI) may be variable. In some cases, an eCC may utilize a different symbol duration than other CCs, which may include use of a reduced symbol duration as compared with symbol durations of the other CCs. A shorter symbol duration is associated with increased subcarrier spacing. A device, such as a UE 115 or base station 105, utilizing eCCs may transmit wideband signals (e.g., 20, 40, 60, 80 MHz., etc.) at reduced symbol durations (e.g., 16.67 microseconds). A TTI in eCC may consist of one or multiple symbols. In some cases, the TTI duration (that is, the number of symbols in a TTI) may be variable.

Figure 2:
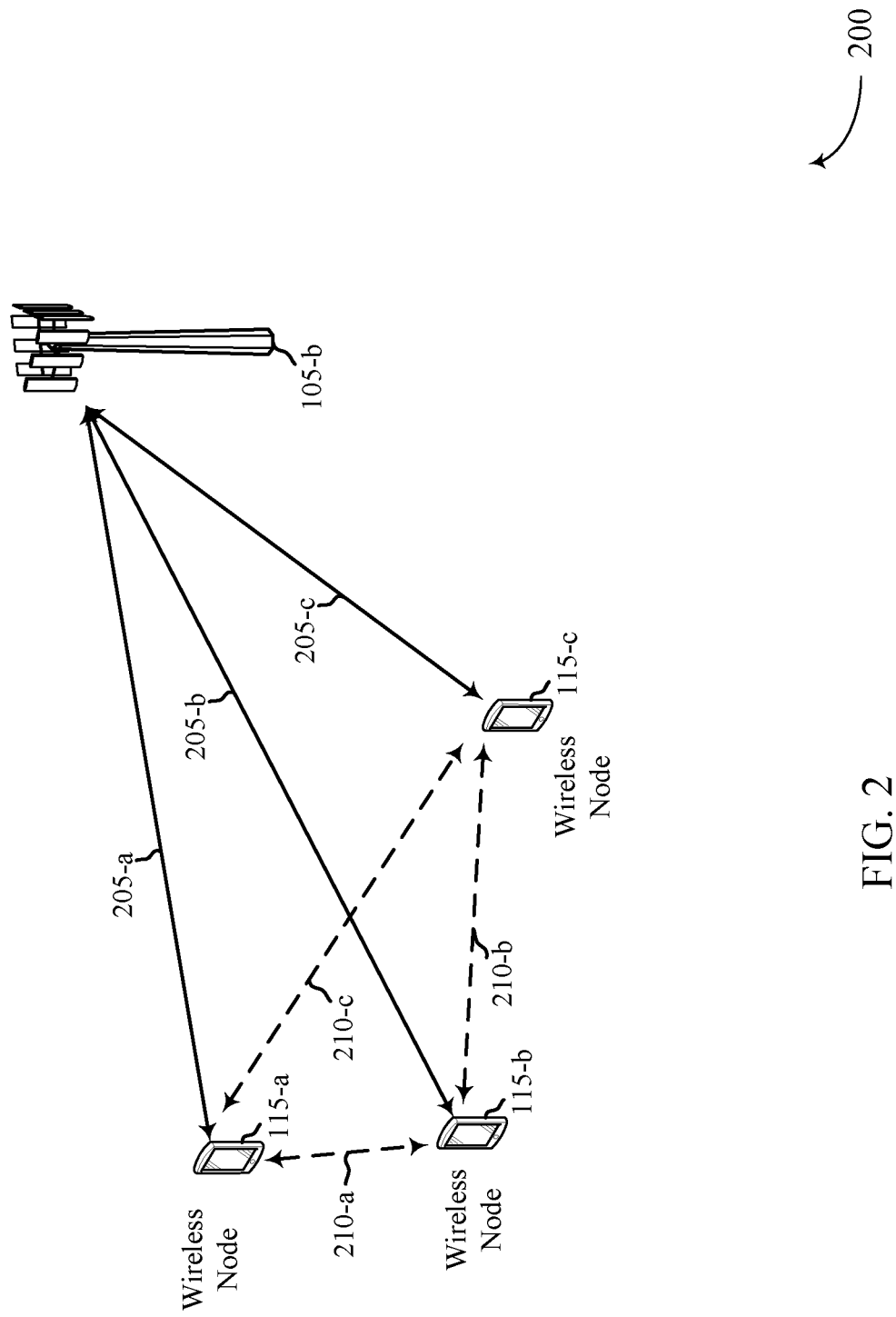
FIG. 2 illustrates an example of a system for wireless communication that supports NR LBT procedures for spectrum sharing, in accordance with one or more aspects of the present disclosure.

FIG. 2 illustrates an example of a wireless communication system 200 that supports NR LBT for spectrum sharing, in accordance with one or more aspects of the present disclosure. Wireless communication system 200 may implement one or more aspects of wireless communication system 100 of FIG. 1. Wireless communication system 200 may include a base station 105-b and UEs 115-a, 115-b, and 115-c, which may be examples of the corresponding devices of FIG. 1.

Generally, wireless communication system 200 may include base station 105-b transmitting to and receiving information from UEs 115 via links 205, which may be examples of the corresponding links of FIG. 1. For example, base station 105-b may communicate with UE 115-a via link 205-a, communicate with UE 115-b via link 205-b, and/or communicate with UE 115-c via link 205-c. Further, one or more of UEs 115 may communicate with each other directly via links 210, which may be examples of the corresponding links of FIG. 1. For example, UE 115-a may communicate with UEs 115-b via link 210-a and with UE 115-c via link 210-c. Also, UE 115-b may communicate with UE 115-c via link 210-b. Although links 205 and/or 210 may be used for communications, it can also be appreciated that one or more transmissions via links 205 and/or 210 may cause or otherwise contribute to interference for an unintended recipient, e.g., any or all of base station 105-b, UE 115-a, UE 115-b, and/or UE 115-c. For example, transmissions between base station 105-b and UE 115-b via link 205-b may cause or contribute to interference for UEs 115-a and/or 115-c.

Conventional wireless communication systems may utilize a channel access procedure based on a detected energy level on the channel. These techniques, however, may suffer from such problems as a hidden node, poor spatial reuse, asymmetric links, starvation, etc. Examples of conventional techniques may include a carrier sense/multiple-access (CSMA) procedures that executes a single LBT state procedure on a single 20 MHz channel, irrespective of the supported communication bandwidth. For example, CSMA techniques may not support a smooth transition between time and frequency reuse. Additionally, conventional techniques may rely on signal energy detection for the decision of whether to perform backoff and may not consider the SINR at the receiver.

Accordingly, aspects of the present disclosure provide for a transmitting wireless node to perform exponential backoff (e.g., the described backoff operations) based on how much the transmitting wireless node interferes with other links, e.g., with other wireless nodes, rather than how much interference the receiver of the transmitting wireless node measures. Thus, the exponential backoff may act as a penalty for the jamming node, e.g., the transmitting wireless node, rather than being applied to a victim link in accordance with conventional techniques. In some aspects, the exponential backoff may reduce interference below a threshold level for a receiver, e.g., the other wireless nodes, by performing backoff power off (e.g., blanking), power control, beamforming, etc. In some examples, the described techniques provide for a learning algorithm that favors contention on channels (e.g., subbands) with a lower exponential backoff (e.g., with a lower backoff window). This may improve frequency reuse, for example.

Initially, it is noted that any or all of base station 105-b, UEs 115-a, 115-b, and/or 115-c may be considered a wireless node. For example, a transmitting wireless node may generally refer to a device that receives stress beacon(s) from other wireless nodes and adjusts a backoff window, performs power backoff operations, performs transmission blanking, etc., based on the stress beacon. Conversely, a receiving wireless node may generally refer to a device that determines an allowable interference level for a channel and transmits a stress beacon that conveys an indication of the allowable interference level. Thus, any or all of base station 105-b, UEs 115-a, 115-b, and/or 115-c may be considered a transmitting wireless node or a receiving wireless node, dependent upon the context. Moreover, any or all of base station 105-b, UEs 115-a, 115-b, and/or 115-c may support operations as a transmitting wireless node and operations as a receiving wireless node. For example, any or all of base station 105-b, UEs 115-a, 115-b, and/or 115-c may determine channel interference levels and transmit stress beacons accordingly and, also, receive stress beacons transmitted from other wireless nodes and perform backoff operations based on the stress beacons.

In some aspects, the described NR LBT procedure may include a stress beacon that is sent by a receiving wireless node to inform or otherwise be used by potential jammers (e.g., other wireless nodes) to perform backoff operations. The stress beacon, in some examples, may not be transmitted at a power level to achieve deep penetration.

In one example of a DL transmission, base station 105-b may send a trigger message to UEs 115 that triggers transmission of the stress beacon. The trigger message may be a request-to-send (RTS) message, such as an eRTS message, in some examples. The trigger message may include an identifier of the UE 115, e.g., identifies which UE 115 that base station 105-b is requesting a stress beacon from. The trigger message may also include a duration field, such as a network allocation vector (NAV) that indicates an amount (e.g., data size and/or time period) of information that base station 105-b has to send to the UE 115. The trigger message may cause the receiving UE 115 to trigger a sounding reference signal (SRS), or some other reference signal such as a pilot signal. The trigger message may also cause the UE 115 to determine or identify a CQI for the channel that the trigger message was received on. Thus, the trigger message may be used by the UE 115 for detection and to determine or otherwise identify the upcoming burst bandwidth.

In response, the UE 115 may respond with a stress beacon. In some examples, the stress beacon may be a clear-to-send (CTS) message, such as an eCTS message. Generally, the stress beacon may include or otherwise convey an indication of an attribute, such as the allowable interference level for the UE 115. For example, the UE 115 may determine the current interference level detected on the channel, determine a maximum amount of interference that can be experienced without disrupting communications on the channel, and identify the allowable interference level based on the different between the current and the maximum interference levels. In some aspects, the stress beacon may include an indicator of the allowable interference level, e.g., one or more information elements, fields, etc. In some examples, the stress beacon may include a NAV field where the value of the NAV conveys an indication of the allowable interference level. In some examples, the stress beacon is conveyed with an SRS that can be used by other wireless nodes to determine channel interference. The base station 105-b may receive the stress beacon and respond with the downlink burst information, provided the stress beacon indicates that the current interference level for the channel supports communications.

One non-limiting example may include a receiver q, e.g., UE 115-a, receiving the trigger message from transmitter j, e.g., base station 105-b. The receiver may determine or otherwise identify whether the SINR for the channel that the trigger message was received is less than a threshold. For example, if the interference level is high and therefore communications are not supported on the channel, the receiver may configure the stress beacon with an indication that the receiver is experiencing high interference levels and cannot support receiving communications. Accordingly, the receiver may set the NAV field to "0" to convey the indication of no allowable interference. If, however, the SINR for the channel is greater than a threshold level, this may indicate that there is an allowable interference level.

In some examples, the receiver may calculate the allowable interference level as a function of carrier to interference power, e.g., C2I, where C relates to the carrier power level and each instance of I relates to interference caused by other wireless nodes. For example, the receiver may use the formula $$n^* = \text{argmax} \frac{1}{n+1} \log 1 + SINR_n$$

to remove dominant jamming wireless nodes. n may refer to the number of other receivers that the receiver is requesting to take action, e.g., to perform backoff operations. The receiver may include or otherwise convey an indication of $I_n$ in the stress beacon to convey an indication of an allowable interference level, e.g., to convey an indication that the receiver can tolerate any interference so long as it is below this interference level. The particular contents and/or format of the stress beacon may be different for different channels.

A transmitting wireless node, e.g., a transmitter j, may maintain a backoff window $W_{jk}$ (e.g., a CW) for each channel k. In some examples, $W_{jk}$ may be a function of the number of stress beacons that the transmitter receives during a time window T Thus, the backoff window may be expressed as $W_{jk}(t)=f(\text{num}_{CTS}, t, t-T)$. The function f(•) may also consider the account reservation duration (e.g., NAV field) included in the stress beacons, which can be used to calculate medium utilization for a given receiver. The function f(•) may also consider the number of distinct networks, the number of service set identifiers (SSIDs), and/or public land mobile network (PLMN) identifiers rather than the number of devices. The function f(•) may also assign a weight to each stress beacon by the received power level for the stress beacon, the allowable interference level included in the stress beacon, and the actual transmit power level of the transmitter.

In one example where a trigger message is detected during a countdown of a backoff window, the transmitter may wait to decode the stress beacon before completing the countdown. If a stress beacon is detected during the countdown, the transmitter may pause the countdown and update the backoff window based on the stress beacon. Accordingly, the transmitter may apply the appropriate backoff behavior based on the allowable interference level, SRS, and NAV, e.g., power control or interference nulling through beamforming.

In one example of transmit power backoff, the transmitter k may calculate the required backoff from the maximum transmit power to meet the lowest required allowable interference levels. The calculation may include $\delta_k = \max_{j \in \varphi_k}(P_{Max}-L_{kj}-I_{max,j})$. The value $\varphi_k$ may represent the set of victim UEs 115 whose stress beacons were accepted. The value $L_{kj}$ may represent the pathloss from the stress beacon UE j to the transmitter k. In some examples, each stress beacon may be transmitted at a fixed power level that is known a priori to allow assumption of the pathloss. In another example, the stress beacon may include an indicator of the transmit power used to transmit the stress beacon, which may then be used to calculate the pathloss. The value $I_{max,j}$ may represent the maximum allowable interference level included in the stress beacon. In the example where $\delta_{max}$ is equal to zero, the transmitter may utilize a TDM scheme instead.

In some aspects, the described techniques may provide for a learning algorithm that favors channels having a lower backoff window. For example, a transmitter may maintain a backoff window for each channel, e.g., each channel that the transmitter may use for communications. Channels in which the transmitter is causing interference to a large number of wireless nodes may, accordingly, have a higher backoff window. Thus, the transmitter may select a transmission bandwidth for the burst transmission that naturally deprioritizes channels with the highest backoff window. The transmitter may select the channels having a backoff window above a threshold level and assign a low priority level to these channels. This may provide for the associated receivers that will not send stress beacons on these channels, allowing other conflicting jamming wireless nodes to reduce their backoff windows on these channels. This supports a natural transition between spatial reuse and frequency reuse.

In some aspects where most of all of the channels have a high backoff window, the transmitter may perform a reset operation. The reset operation may include the transmitter selecting a random subset of the channels and reset the backoff window for these channels to a minimum value. In one example, the resent time and the which channels are reset may be a function of the transmitter identity. Provided a sufficient number of transmitters performing the reset procedure, other jamming wireless nodes will likely select non-overlapping channels to support frequency reuse.

In another example of an uplink transmission, the base station 105-b may transmit the stress beacon to the UE 115, followed by downlink control information, and then the UE 115 may respond by transmitting the uplink burst information. Thus, the base station 105-b may signal the allowable interference level in the stress beacon to inform the UE 115 that the uplink burst is permitted.

Figure 3:
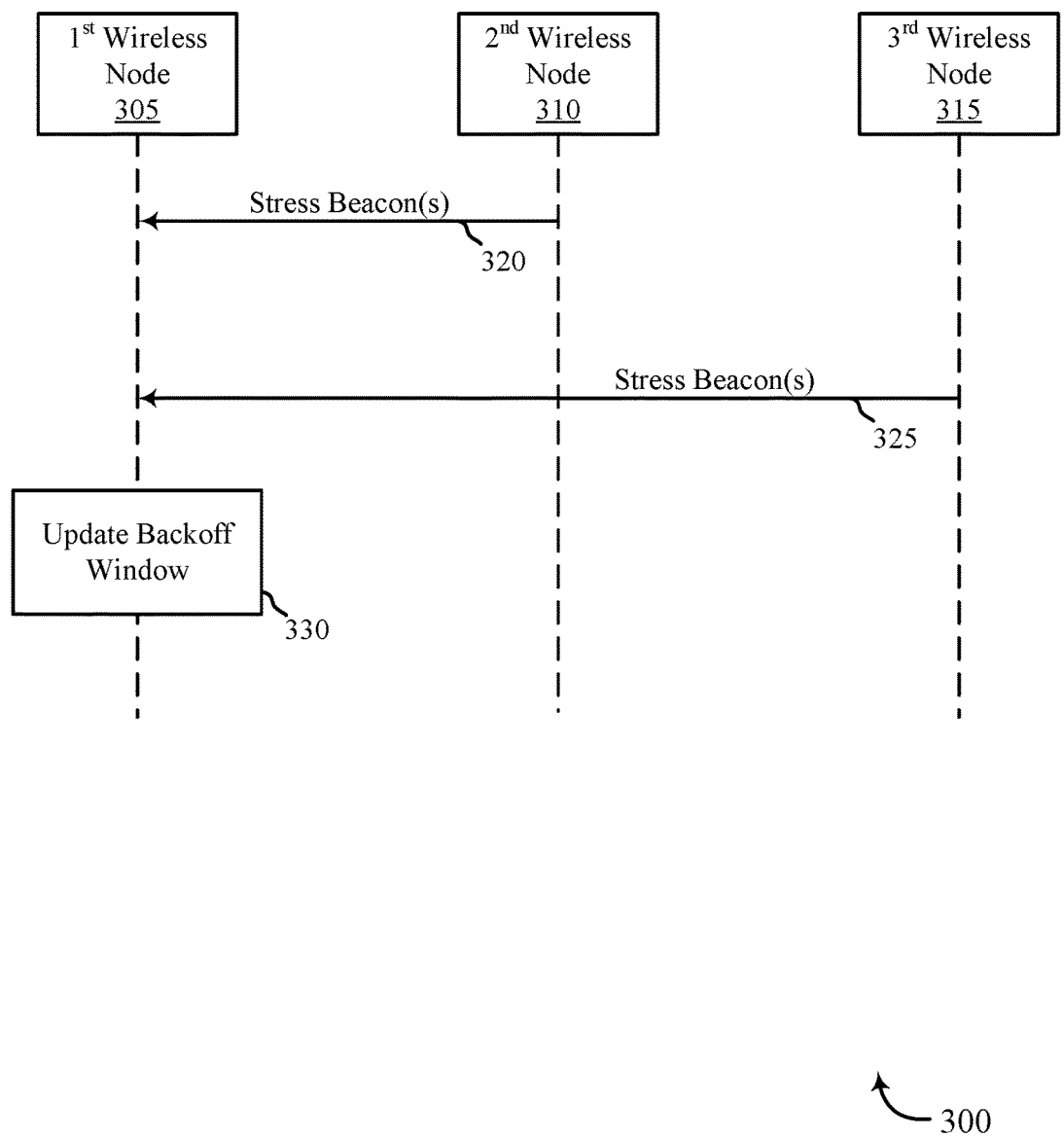
FIG. 3 illustrates an example of a process flow that supports NR LBT procedures for spectrum sharing, in accordance with one or more aspects of the present disclosure.

FIG. 3 illustrates an example of a process flow 300 for NR LBT for spectrum sharing, in accordance with one or more aspects of the present disclosure. Process flow 300 may implement one or more aspects of wireless communication systems 100 and 200 of FIGS. 1 and 2, respectively. Process flow 300 may include a first wireless node 305, a second wireless node 310, and a third wireless node 315, which may be examples of the wireless nodes, base station 105, and/or UE 115 described with reference to FIGS. 1 and 2. In some aspects, the first wireless node 305 may be considered a transmitting wireless node and second wireless node 310 and third wireless nodes 315 may be considered receiving wireless nodes. As previously discussed, any of wireless nodes 305-315 may act as both a transmitting wireless node and a receiving wireless node, dependent upon the circumstances.

At 320, second wireless node 310 may transmit a stress beacon to first wireless node 305. The stress beacon may be transmitted on a channel and may include an indication of an attribute, such as an allowable interference level for second wireless node 310. The stress beacon may be an eCTS message, in some examples. Similarly, at 325 the third wireless node 315 may transmit a stress beacon to first wireless node 305. The stress beacon may be transmitted on a channel and may include an indication of an attribute, such as an allowable interference level for third wireless node 315. The stress beacon may be an eCTS message, in some examples. In some cases, the allowable interference levels indicated in the stress beacons may be based on transmissions previously received by second and third wireless nodes 310 and 315, e.g., based on previous transmissions from first wireless node 305. In some cases, first wireless node 305 may transmit (not shown) a trigger message to initiate transmission of the stress beacons, e.g., an eRTS message. Although two stress beacons are shown in process flow 300, it is to be understood that first wireless node 305 may receive more stress beacon from other wireless nodes.

At 330, first wireless node 305 may update a backoff window for the channel based on the allowable interference levels indicated in the stress beacons received at 320 and 325. Generally, updating the backoff window may include one or more backoff operations. For example, updating the backoff window may include updating the time period that first wireless node waits to reattempt media contention after a determination that the channel is busy, e.g., the CW. Other examples of backoff operations may include power backoff operations, etc. Accordingly, first wireless node 30 5 may use the backoff window to determine whether to perform power backoff operations, a transmission blanking procedure (e.g., cease transmissions on the channel), and/or a beamforming operation on the channel.

For example, first wireless node 305 may identify a backoff transmit power level based on the allowable interference levels indicated in the stress beacons received at 320 and 325. First wireless node 325 may adjust its transmit power according to the backoff transmit power. Accordingly, first wireless node 305 may continue to access the channel for communication and keep the interference level for second and/or third wireless nodes 310 and 315 below their respective allowable interference levels. In some examples, identifying the backoff transmit power level may be based on calculating or otherwise identifying a pathloss value for each stress beacon. The amount of backoff transmit power level may be based on the pathloss. In another example, first wireless node 305 may determine that the backoff transmit power level is above a threshold, e.g., too high to support communications for first wireless node 305. Accordingly, first wireless node 305 may switch to a TDM transmission scheme for communications.

In some aspects, the first wireless node 305 may update the backoff window based on the number of wireless nodes detected. For example, first wireless node 305 may identify a stress beacon count (e.g., a count of two in this example) indicative of the number of stress beacons received on the channel and update the backoff window based on the count value. In some examples, a higher stress beacon count value may indicate more traffic on the channel and therefore first wireless node 305 may extend the backoff window. In some aspects, first wireless node 305 may identify a total network count associated with detected networks (e.g., SSIDs, PLMN IDs, etc.). and update the backoff window based on the network count.

In some aspects, first wireless node 305 may receive additional stress beacon(s), e.g., during a backoff window countdown period. First wireless node 305 may pause the backoff window countdown and update the backoff window allowable interference levels indicated in the subsequent stress beacons. In other examples, first wireless node 305 may not pause the backoff window countdown and instead apply the updated backoff window during the next backoff window countdown period. In one example, first wireless node 305 may update the current backoff window countdown when the changes in the backoff window based on the subsequent stress beacon are above a threshold value.

Figure 4:
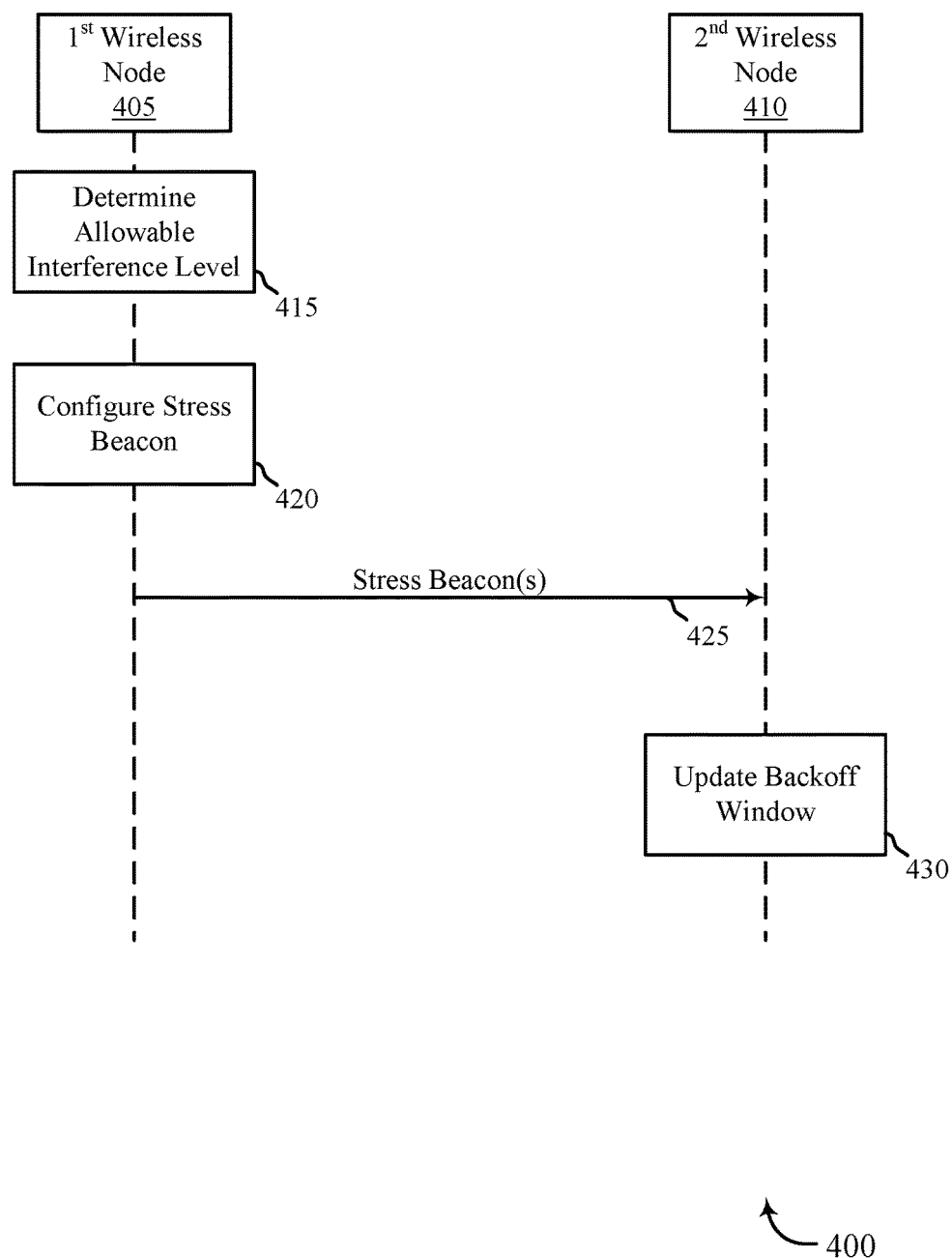
FIG. 4 illustrates an example of a process flow that supports NR LBT procedures for spectrum sharing, in accordance with one or more aspects of the present disclosure.

FIG. 4 illustrates an example of a process flow 400 for NR LBT for spectrum sharing, in accordance with one or more aspects of the present disclosure. Process flow 400 may implement one or more aspects of process flow 300 and/or one or more aspects of wireless communication systems 100 and 200 of FIGS. 1 and 2, respectively. Process flow 400 may include a first wireless node 405 and a second wireless node 410, which may be examples of the wireless nodes, base station 105, and/or UE 115 described with reference to FIGS. 1 and 2. In some aspects, the first wireless node 405 may be considered a receiving wireless node and second wireless node 410 may be considered transmitting wireless node. As previously discussed, any of wireless nodes 405-410 may act as both a transmitting wireless node and a receiving wireless node, dependent upon the circumstances.

At 415, first wireless node 405 may determine an attribute, such as an allowable interference level. For example, first wireless node 405 may determine whether the current channel interference level is above a threshold level. First wireless node 405 may determine a SINR for the channel determine whether the channel SINR is less than a SINR threshold level. In some examples, the threshold level may be associated with a maximum level of interference that first wireless node 405 can support while still performing communications on the channel. Thus, calculating the allowable interference level may be a function of the carrier to interference power, e.g., C2I as discussed with reference to FIG. 2. Accordingly, the carrier to interference power may be based on stress beacons received from other wireless nodes.

At 420, first wireless node 405 may configure a stress beacon based on the determination of the current channel interference level is above the threshold level. In some aspects, the configured stress beacon may include a duration field. In some aspects, configuring the stress beacons may include configuring a reference signal (e.g., a SRS) to be transmitted at a predetermined power level. Additionally or alternatively, configuring the stress beacon may include adding a duration field (e.g., NAV field) to the stress beacon and selecting a value for the duration field to convey the indication of the allowable interference level. In one example, a "0" value for the duration field may indicate that no interference is allowed and therefore no transmissions are allowed from neighboring wireless nodes.

At 425, first wireless node 405 may transmit the stress beacon to second wireless node 410. In some examples, the stress beacon may be broadcast. The stress beacon may be an eCTS message, in some examples.

At 430, second wireless node 410 may update a backoff window, in accordance with the techniques described with reference to the first wireless node 305 of process flow 300.

Figure 5:
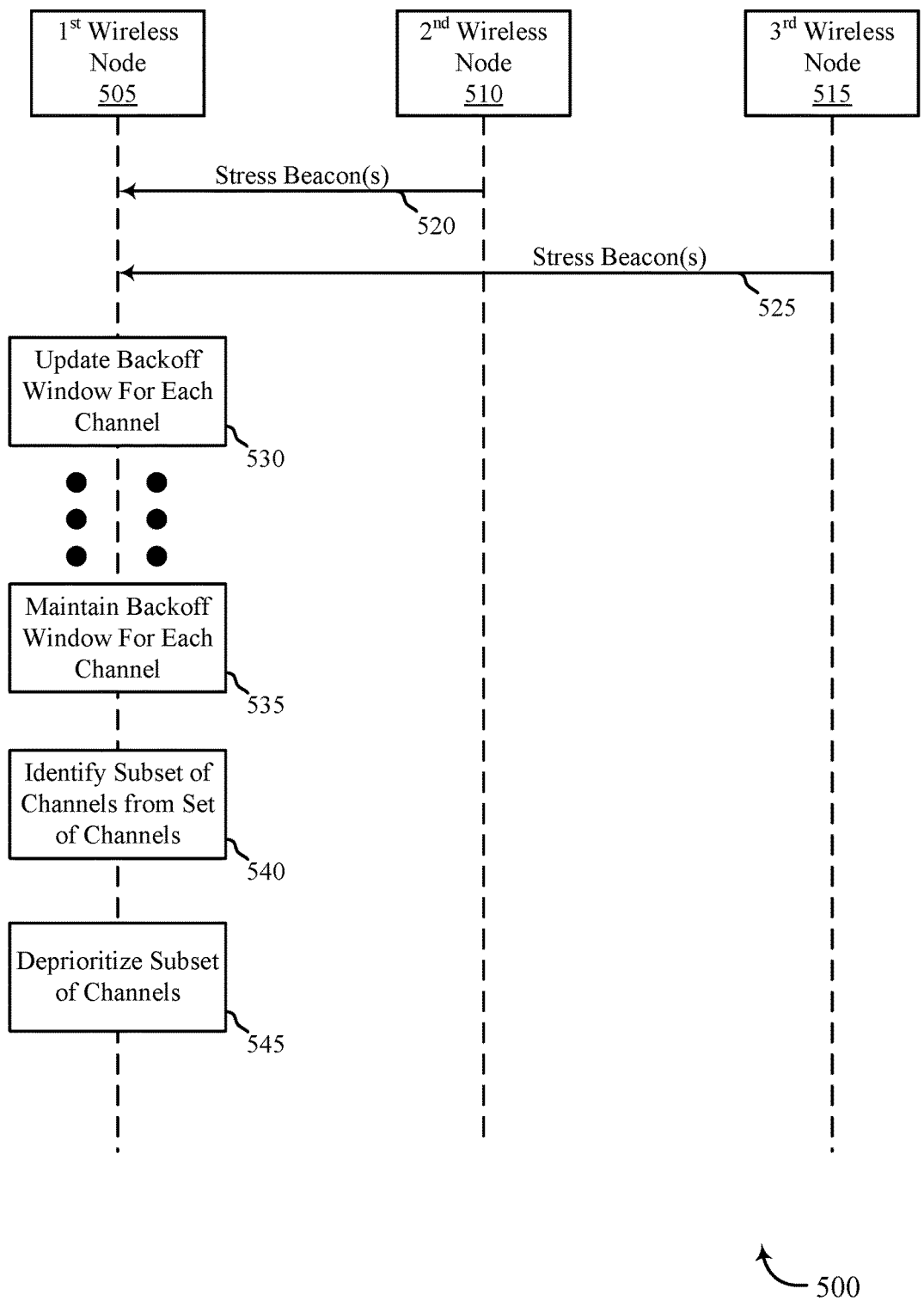
FIG. 5 illustrates an example of a process flow that supports NR LBT procedures for spectrum sharing, in accordance with one or more aspects of the present disclosure.

FIG. 5 illustrates an example of a process flow 500 for NR LBT for spectrum sharing, in accordance with one or more aspects of the present disclosure. Process flow 500 may implement one or more aspects of process flows 300 and 400 and/or one or more aspects of wireless communication systems 100 and 200 of FIGS. 1 and 2, respectively. Process flow 500 may include a first wireless node 505, a second wireless node 510, and a third wireless node 515, which may be examples of the wireless nodes, base station 105, and/or UE 115 described with reference to FIGS. 1 and 2. In some aspects, the first wireless node 505 may be considered a transmitting wireless node and second wireless node 510 and third wireless nodes 515 may be considered receiving wireless nodes. As previously discussed, any of wireless nodes 505-515 may act as both a transmitting wireless node and a receiving wireless node, dependent upon the circumstances.

At 520, second wireless node 510 may transmit a stress beacon to first wireless node 505. At 525, third wireless node 515 may transmit a stress beacon to first wireless node 505. At 530, first wireless node 505 may update a backoff window for each channel that the stress beacons were received on. The features at 520, 525, and 530 may be performed in accordance with the techniques described with reference to process flows 300 and 400.

At 535, first wireless node 505 may perform the previous procedures (e.g., stress beacon-update backoff window) for multiple channels and maintain a backoff window for each channel. Each of the channels may collectively be a set of channels that first wireless node 505 maintains a backoff window for.

At 540, first wireless node 505 may identify a subset of channels from the set of channels. The channels of the subset of channels may be associated with a backoff window above a threshold level. Accordingly, these channels may be considered busy channels where little or no additional interference is allowed.

At 545, first wireless node 505 may deprioritize the subset of channels. Deprioritizing the subset of channels may include assigning a low priority to each channel of the subset of channels, e.g., lower than the priority levels assigned to channels having a backoff window below the threshold level.

In some aspects, first wireless node 505 may perform a reset procedure (not shown) when an excessive number of channels have a high backoff window. For example, first wireless node 505 may determine that the subset of channels includes a predetermined number of channels, e.g., 75, 85, 90, 95% of the channels of the set of channels. Accordingly, first wireless node 505 may select a random subset of channels from the set of channels and reset the backoff window for these channels in the random subset of channels to a predetermined minimum value. In one example, first wireless node 505 may select the random subset of channels according to the identifier of the first wireless node 505.

Figure 6:
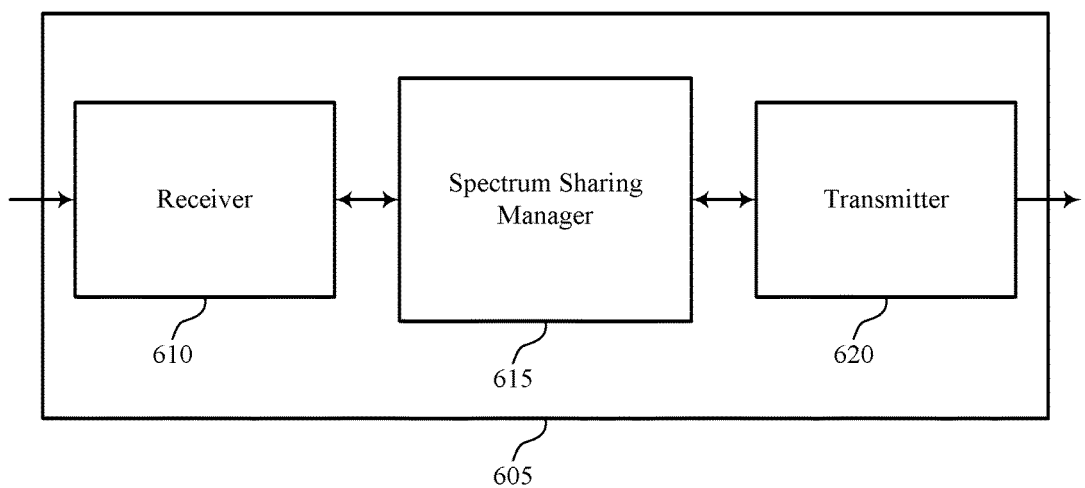
FIGS. 6 through 8 show block diagrams of a device that supports NR LBT procedures for spectrum sharing, in accordance with one or more aspects of the present disclosure.

FIG. 6 shows a block diagram 600 of a device 605 that supports NR LBT for spectrum sharing, in accordance with one or more aspects of the present disclosure. Device 605 may be an example of aspects of a UE 115 or base station 105 as described with reference to FIGS. 1 and 2. Device 605 may be an example of aspects of a wireless node as described with reference to FIGS. 3-5. Device 605 may include a receiver 610, a spectrum sharing manager 615, and a transmitter 620. Device 605 may also include a processor. Each of these components may be in communication with one another (e.g., via one or more buses).

Receiver 610 may receive information such as packets, user data, or control information associated with various information channels (e.g., control channels, data channels, and information related to NR LBT for spectrum sharing, etc.). Information may be passed on to other components of the device 605. The receiver 610 may be an example of aspects of the transceiver 935 described with reference to FIG. 9.

Spectrum sharing manager 615 may be an example of aspects of the spectrum sharing manager 915 described with reference to FIG. 9. Spectrum sharing manager 615 may be an example of aspects of UE spectrum sharing manager 101 and/or network spectrum sharing manager 102 described with reference to FIG. 1. Spectrum sharing manager 615 may receive one or more stress beacons on a channel, each of the one or more stress beacons including an indication of an attribute such as an allowable interference level for a corresponding wireless node on the channel and update a backoff window for the channel based on the attribute(s) indicated by the respective one or more stress beacons.

The spectrum sharing manager 615 may also maintain a backoff window for each channel of a set of channels, identify a subset of channels from the set of channels, each channel of the subset of channels having a corresponding backoff window above a threshold level, and deprioritize the subset of channels such that each channel of the subset of channels is assigned a priority that is lower than channels having a corresponding backoff window below the threshold level.

The spectrum sharing manager 615 may also determine whether an identified channel interference level is above a threshold, configure a stress beacon based on the determination of whether the identified channel interference level is above the threshold level, wherein the configured stress beacon comprises a duration field, and transmit the configured stress beacon, the stress beacon including an indication of an attribute.

Transmitter 620 may transmit signals generated by other components of the device. In some examples, the transmitter 620 may be collocated with a receiver 610 in a transceiver module. For example, the transmitter 620 may be an example of aspects of the transceiver 935 described with reference to FIG. 9. The transmitter 620 may include a single antenna, or it may include a set of antennas.

Figure 7:
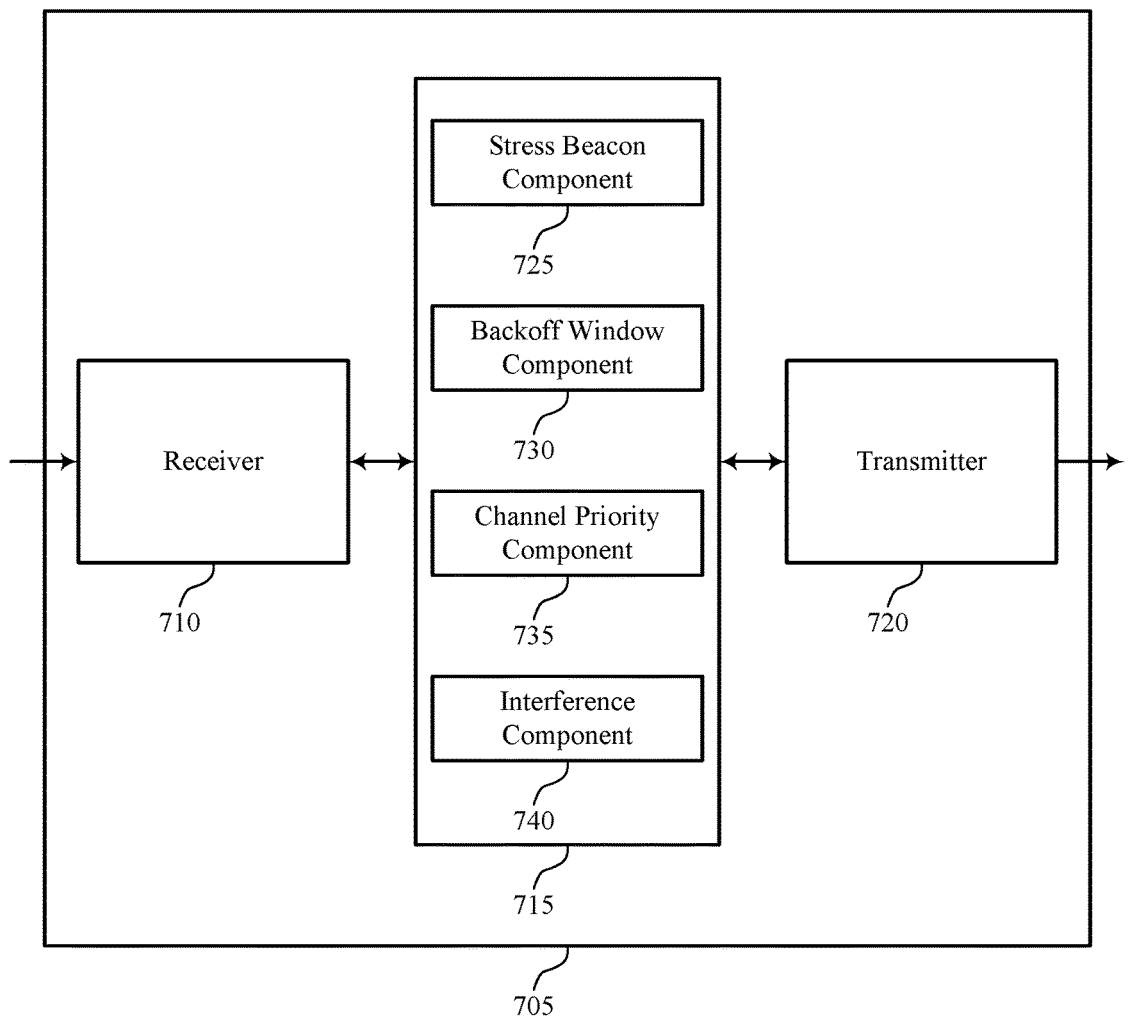

FIG. 7 shows a block diagram 700 of a device 705 that supports NR LBT for spectrum sharing, in accordance with one or more aspects of the present disclosure. Device 705 may be an example of aspects of a device 605 or a UE 115 or base station 105 or a wireless node as described with reference to FIGS. 1 through 6. Device 705 may include a receiver 710, a spectrum sharing manager 715, and a transmitter 720. Device 705 may also include a processor. Each of these components may be in communication with one another (e.g., via one or more buses).

Receiver 710 may receive information such as packets, user data, or control information associated with various information channels (e.g., control channels, data channels, and information related to NR LBT for spectrum sharing, etc.). Information may be passed on to other components of the device. The receiver 710 may be an example of aspects of the transceiver 935 described with reference to FIG. 9.

Spectrum sharing manager 715 may be an example of aspects of the spectrum sharing manager 915 described with reference to FIG. 9. Spectrum sharing manager 715 may also include stress beacon component 725, backoff window component 730, channel priority component 735, and interference component 740.

Stress beacon component 725 may receive one or more stress beacons on a channel, each of the one or more stress beacons including an indication of an attribute such as an allowable interference level for a corresponding wireless node on the channel. Stress beacon component 725 may also receive a subsequent stress beacon during a backoff window period, configure a stress beacon based on the determination of whether the identified channel interference level is above the threshold level, wherein the configured stress beacon comprises a duration field, and identify a stress beacon count indicative of a number of the one or more stress beacons received on the channel.

Stress beacon component 725 may also select a value of the duration field to convey an indication of the attribute, select a value of zero for the duration field to convey an indication that no transmission is allowed, broadcast the stress beacon, and transmit the configured stress beacon, the stress beacon including the indication of the attribute.

In some cases, the stress beacon is included in an eCTS message. In some cases, the attribute(s) indicated by the one or more stress beacons are associated with one or more prior transmissions. In some cases, configuring the stress beacon includes configuring a reference signal to be transmitted at a predetermined power level. In some cases, configuring the stress beacon includes: including a duration field within the stress beacon.

Backoff window component 730 may update a backoff window for the channel based on the attribute(s) indicated by the respective one or more stress beacons. Backoff window component 730 may also update the backoff window based on the stress beacon count and update the backoff window based on the total network count. Backoff window component 730 may pause the backoff window and update the backoff window based on the indication in the subsequent stress beacon of the attribute for the corresponding wireless node. Backoff window component 730 may resume the backoff window period according to the updated backoff window, maintain a backoff window for each channel of a set of channels, and reset, to a predetermined minimum value, the corresponding backoff windows for each of the random subset of channels. Backoff window component 730 may update the backoff window for the channel based at least in part on the one or more stress beacons. Backoff window component 730 may update the backoff window for the channel based at least in part on one or more of an ACK/NACK feedback message, a CQI feedback message, a measurement report provided by a network listen module, or combinations thereof.

Channel priority component 735 may identify a subset of channels from the set of channels, each channel of the subset of channels having a corresponding backoff window above a threshold level. Channel priority component 735 may also deprioritize the subset of channels such that each channel of the subset of channels is assigned a priority that is lower than channels having a corresponding backoff window below the threshold level, determine that the subset of channels includes at least a predetermined number of channels, select a random subset of channels of the set of channels, and select the random subset of channels of the set of channels based on an identity field. Channel priority component 735 may update the backoff window for each channel of the set of channels based at least in part on receiving one or more stress beacons on the channel. Channel priority component 735 may update the backoff window for each channel of the set of channels based at least in part on one or more of an ACK/NACK feedback message received on the channel, a CQI feedback message received on the channel, a measurement report provided by a network listen module on the channel, or combinations thereof.

Interference component 740 may determine whether an identified channel interference level is above a threshold, determine that the SINR for the channel is less than an SINR threshold, and calculate the attribute (for example, the allowable interference level) as a function of carrier to interference power. In some cases, determining whether the identified channel interference level is above the threshold includes: determining an SINR for a channel corresponding to the identified channel interference level. In some cases, the carrier to interference power is based on one or more stress beacons received from other wireless nodes.

Transmitter 720 may transmit signals generated by other components of the device 705. In some examples, the transmitter 720 may be collocated with a receiver 710 in a transceiver module. For example, the transmitter 720 may be an example of aspects of the transceiver 935 described with reference to FIG. 9. The transmitter 720 may include a single antenna, or it may include a set of antennas.

Figure 8:
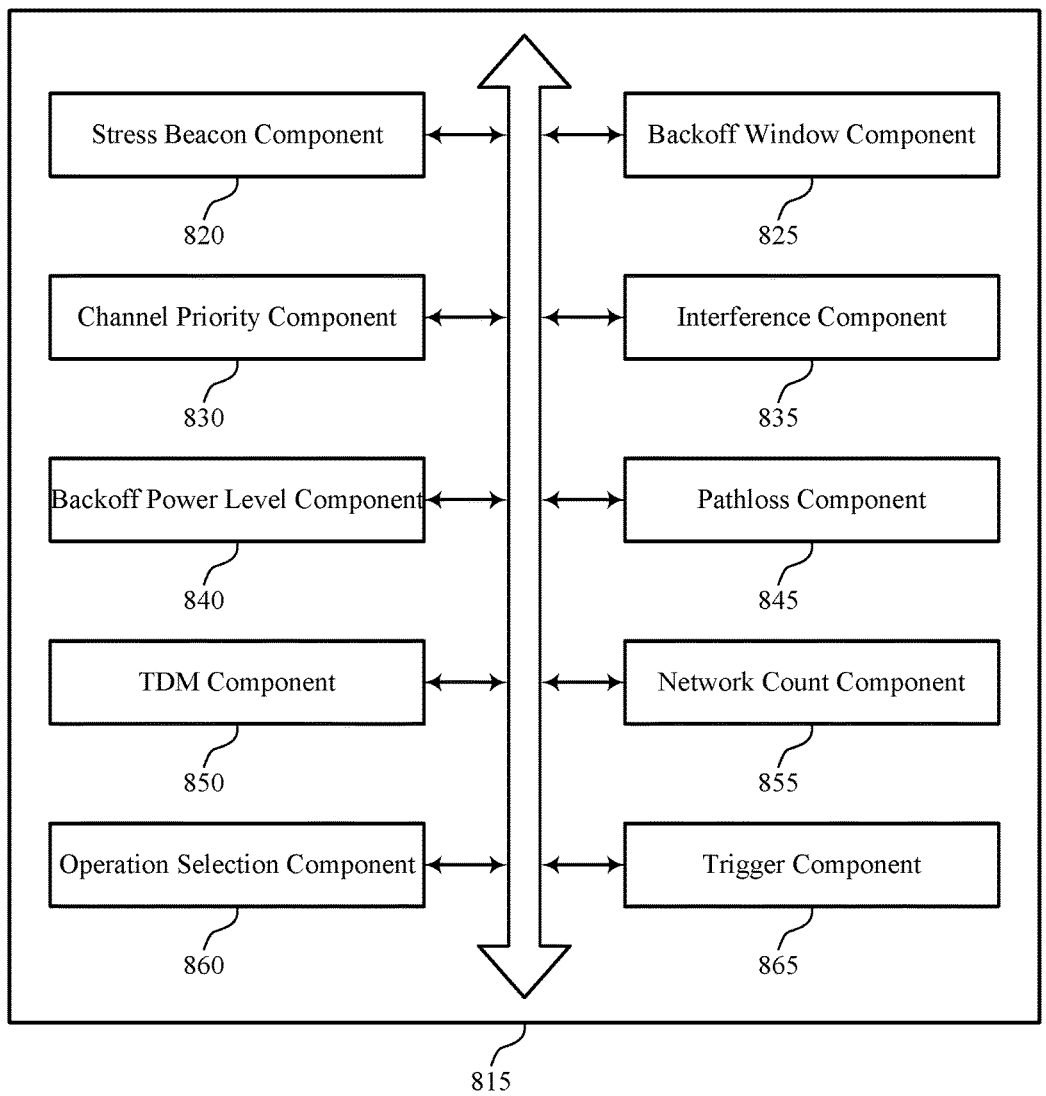

FIG. 8 shows a block diagram 800 of a spectrum sharing manager 815 that supports NR LBT for spectrum sharing, in accordance with one or more aspects of the present disclosure. The spectrum sharing manager 815 may be an example of aspects of a spectrum sharing manager 615, a spectrum sharing manager 715, or a spectrum sharing manager 915 described with reference to FIGS. 6, 7, and 9. The spectrum sharing manager 815 may include stress beacon component 820, backoff window component 825, channel priority component 830, interference component 835, backoff power level component 840, pathloss component 845, TDM component 850, network count component 855, operation selection component 860, and trigger component 865. Each of these components may communicate, directly or indirectly, with one another (e.g., via one or more buses).

Stress beacon component 820 may receive one or more stress beacons on a channel, each of the one or more stress beacons including an indication of an attribute for a corresponding wireless node on the channel. Stress beacon component 820 may also receive a subsequent stress beacon during a backoff window period, configure a stress beacon based on the determination of whether the identified channel interference level is above the threshold level, wherein the configured stress beacon comprises a duration field, and identify a stress beacon count indicative of a number of the one or more stress beacons received on the channel. Stress beacon component 820 may select a value of the duration field to convey an indication of the attribute, select a value of zero for the duration field to convey an indication that no transmission is allowed, broadcast the stress beacon, and transmit the configured stress beacon, the stress beacon including an indication of an attribute.

Backoff window component 825 may update a backoff window for the channel based on the attribute(s) indicated by the respective one or more stress beacons. Backoff window component 825 may also update the backoff window based on the stress beacon count, update the backoff window based on the total network count. Backoff window component 825 may pause the backoff window and update the backoff window based on the indication in the subsequent stress beacon of the attribute for the corresponding wireless node. Additionally, backoff window component 825 may resume the backoff window period according to the updated backoff window, maintain a backoff window for each channel of a set of channels, and reset, to a predetermined minimum value, the corresponding backoff windows for each of the random subset of channels.

Channel priority component 830 may identify a subset of channels from the set of channels, each channel of the subset of channels having a corresponding backoff window above a threshold level, and deprioritize the subset of channels such that each channel of the subset of channels is assigned a priority that is lower than channels having a corresponding backoff window below the threshold level. Channel priority component 830 may determine that the subset of channels includes at least a predetermined number of channels, select a random subset of channels of the set of channels, and select the random subset of channels of the set of channels based on an identity field.

Interference component 835 may determine whether an identified channel interference level is above a threshold, determine that the SINR for the channel is less than an SINR threshold, and calculate the attribute (for example, the allowable interference level) as a function of carrier to interference power. In some cases, determining whether the identified channel interference level is above the threshold includes: determining a SINR for a channel corresponding to the identified channel interference level. In some cases, the carrier to interference power is based on one or more stress beacons received from other wireless nodes.

Backoff power level component 840 may identify a backoff transmit power level based on the attribute(s) indicated by the respective one or more stress beacons, adjust a transmit power based on the backoff transmit power level, identify the backoff transmit power level based on the pathloss value, and determine that the backoff transmit power level is above a threshold level.

Pathloss component 845 may identify a pathloss value associated with the respective one or more stress beacons. TDM component 850 may utilize a time division multiplexing scheme for subsequent transmissions.

Network count component 855 may identify a total network count associated with one or more detected networks. Operation selection component 860 may determine, based on the backoff window, whether to perform one or more of a power backoff operation, a transmission blanking procedure, or a beamforming transmission.

Trigger component 865 may transmit a trigger message to initiate receipt of the one or more stress beacons and receive a trigger message from a transmitting node, the trigger message operative to trigger transmission of the stress beacon. In some cases, the trigger message includes an eRTS message. In some cases, receiving the trigger message includes: receiving an eRTS message.

Figure 9:
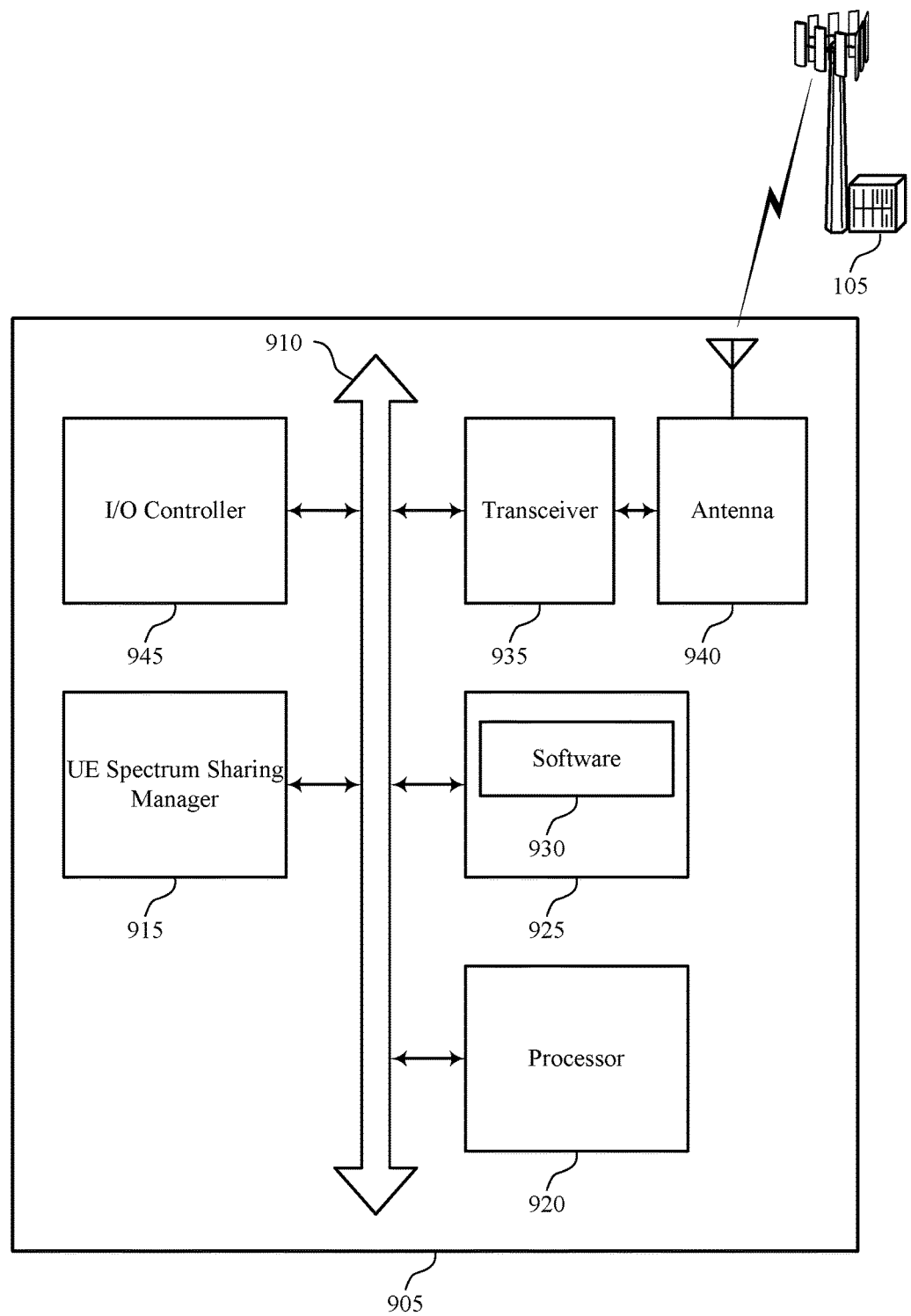
FIG. 9 illustrates a block diagram of a system including a UE that supports NR LBT procedures for spectrum sharing, in accordance with one or more aspects of the present disclosure.

FIG. 9 shows a diagram of a system 900 including a device 905 that supports NR LBT for spectrum sharing in accordance with various aspects of the present disclosure. Device 905 may be an example of or include the components of a wireless node, or a device 605, or a device 705, or a UE 115 as described above, e.g., with reference to FIGS. 1 through 7. Device 905 may include components for bi-directional voice and data communications including components for transmitting and receiving communications, including UE spectrum sharing manager 915, processor 920, memory 925, software 930, transceiver 935, antenna 940, and I/O controller 945. These components may be in electronic communication via one or more busses (e.g., bus 910). Device 905 may communicate wirelessly with one or more base stations 105.

Processor 920 may include an intelligent hardware device, (e.g., a general-purpose processor, a digital signal processor (DSP), a central processing unit (CPU), a microcontroller, an application-specific integrated circuit (ASIC), an field-programmable gate array (FPGA), a programmable logic device, a discrete gate or transistor logic component, a discrete hardware component, or any combination thereof). In some cases, processor 920 may be configured to operate a memory array using a memory controller. In other cases, a memory controller may be integrated into processor 920. Processor 920 may be configured to execute computer-readable instructions stored in a memory to perform various functions (e.g., functions or tasks supporting NR LBT for spectrum sharing).

Memory 925 may include random access memory (RAM) and read only memory (ROM). The memory 925 may store computer-readable, computer-executable software 930 including instructions that, when executed, cause the processor to perform various functions described herein. In some cases, the memory 925 may contain, among other things, a basic input/output system (BIOS) which may control basic hardware and/or software operation such as the interaction with peripheral components or devices.

Software 930 may include code to implement aspects of the present disclosure, including code to support NR LBT for spectrum sharing. Software 930 may be stored in a non-transitory computer-readable medium such as system memory or other memory. In some cases, the software 930 may not be directly executable by the processor 920 but may cause a computer (e.g., when compiled and executed) to perform functions described herein.

Transceiver 935 may communicate bi-directionally, via one or more antennas, wired, or wireless links as described above. For example, the transceiver 935 may represent a wireless transceiver and may communicate bi-directionally with another wireless transceiver. The transceiver 935 may also include a modem to modulate the packets and provide the modulated packets to the antennas for transmission, and to demodulate packets received from the antennas.

In some cases, the wireless device may include a single antenna 940. However, in some cases the device may have more than one antenna 940, which may be capable of concurrently transmitting or receiving multiple wireless transmissions.

I/O controller 945 may manage input and output signals for device 905. I/O controller 945 may also manage peripherals not integrated into device 905. In some cases, I/O controller 945 may represent a physical connection or port to an external peripheral. In some cases, I/O controller 945 may utilize an operating system such as iOS®, ANDROID®, MS-DOS®, MS-WINDOWS®, OS/2®, UNIX®, LINUX®, or another known operating system.

UE spectrum sharing manager 915 may be an example of one or more aspects of UE spectrum sharing manager 101 and/or spectrum sharing managers 615, 715, and 815 described with reference to FIGS. 1 and 6 through 8. UE spectrum sharing manager 915 may implement one or more aspects of wireless communication system 200 and/or process flows 300-500 described with reference to FIGS. 2 through 5.

Figure 10:
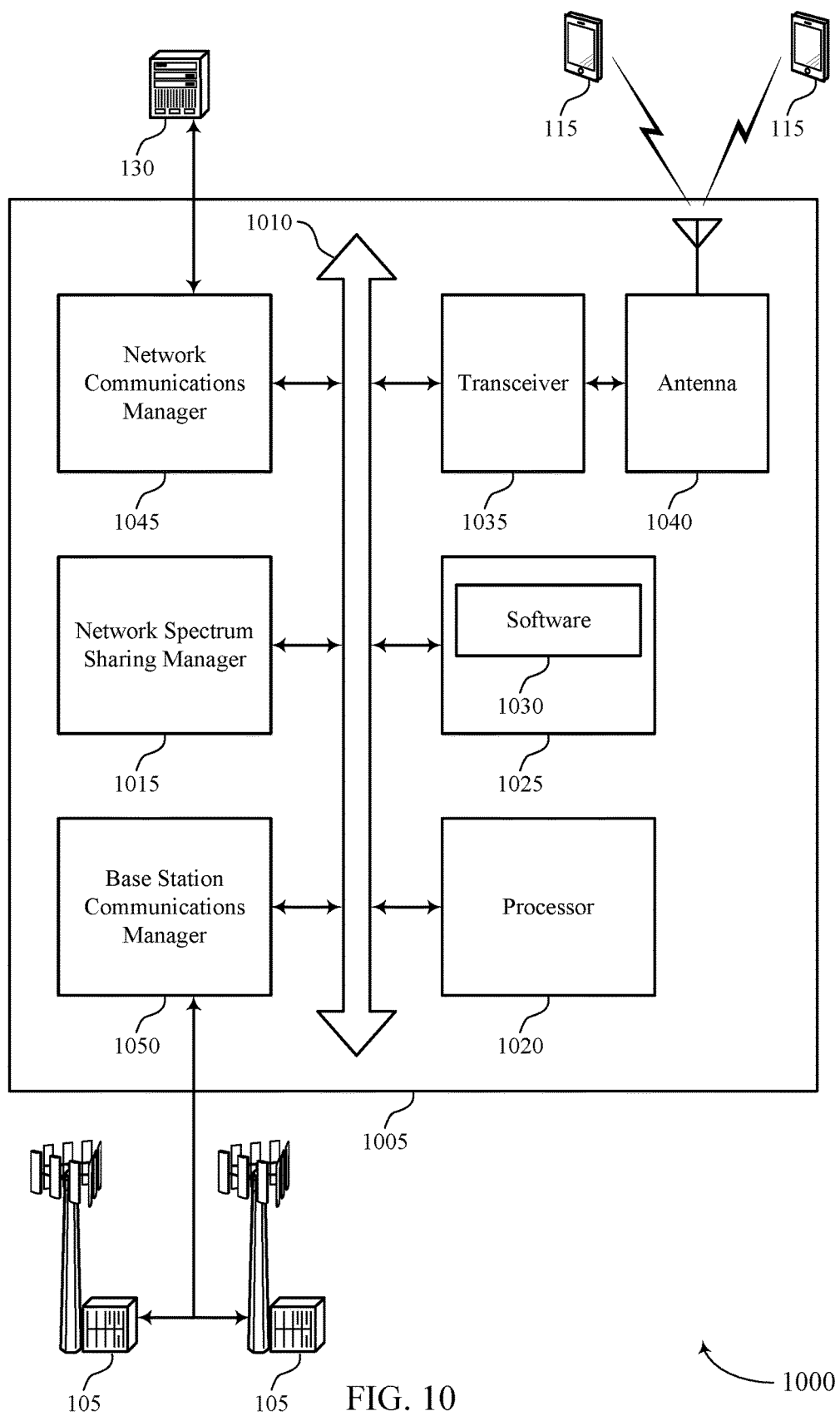
FIG. 10 illustrates a block diagram of a system including a base station that supports NR LBT procedures for spectrum sharing, in accordance with one or more aspects of the present disclosure.

FIG. 10 shows a diagram of a system 1000 including a device 1005 that supports NR LBT for spectrum sharing, in accordance with one or more aspects of the present disclosure. Device 1005 may be an example of or include the components of a wireless node, a device 705, a device 805, or a base station 105 as described above, e.g., with reference to FIGS. 1 through 8. Device 1005 may include components for bi-directional voice and data communications including components for transmitting and receiving communications, including network spectrum sharing manager 1015, processor 1020, memory 1025, software 1030, transceiver 1035, antenna 1040, network communications manager 1045, and base station communications manager 1050. These components may be in electronic communication via one or more busses (e.g., bus 1010). Device 1005 may communicate wirelessly with one or more UEs 115.

Processor 1020 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1020 may be configured to operate a memory array using a memory controller. In other cases, a memory controller may be integrated into processor 1020. Processor 1020 may be configured to execute computer-readable instructions stored in a memory to perform various functions (e.g., functions or tasks supporting NR LBT for spectrum sharing).

Memory 1025 may include RAM and ROM. The memory 1025 may store computer-readable, computer-executable software 1030 including instructions that, when executed, cause the processor to perform various functions described herein. In some cases, the memory 1025 may contain, among other things, a BIOS which may control basic hardware and/or software operation such as the interaction with peripheral components or devices.

Software 1030 may include code to implement aspects of the present disclosure, including code to support NR LBT for spectrum sharing. Software 1030 may be stored in a non-transitory computer-readable medium such as system memory or other memory. In some cases, the software 1030 may not be directly executable by the processor but may cause a computer (e.g., when compiled and executed) to perform functions described herein.

Transceiver 1035 may communicate bi-directionally, via one or more antennas, wired, or wireless links as described above. For example, the transceiver 1035 may represent a wireless transceiver and may communicate bi-directionally with another wireless transceiver. The transceiver 1035 may also include a modem to modulate the packets and provide the modulated packets to the antennas for transmission, and to demodulate packets received from the antennas.

In some cases, the wireless device may include a single antenna 1040. However, in some cases the device may have more than one antenna 1040, which may be capable of concurrently transmitting or receiving multiple wireless transmissions.

Network communications manager 1045 may manage communications with the core network 130 (e.g., via one or more wired backhaul links). For example, the network communications manager 1045 may manage the transfer of data communications for client devices, such as one or more UEs 115.

Base station communications manager 1050 may manage communications with other base stations 105, and may include a controller or scheduler for controlling communications with UEs 115 in cooperation with other base stations 105. For example, the base station communications manager 1050 may coordinate scheduling for transmissions to UEs 115 for various interference mitigation techniques such as beamforming or joint transmission. In some examples, base station communications manager 1050 may provide an X2 interface within an LTE/LTE-A wireless communication network technology to provide communication between base stations 105.

Network spectrum sharing manager 1015 may be an example of one or more aspects of network spectrum sharing manager 102 and/or spectrum sharing managers 615, 715, and 815 described with reference to FIGS. 1 and 6 through 8. Network spectrum sharing manager 1015 may implement one or more aspects of wireless communication system 200 and/or process flows 300-500 described with reference to FIGS. 2 through 5.

Figure 11:
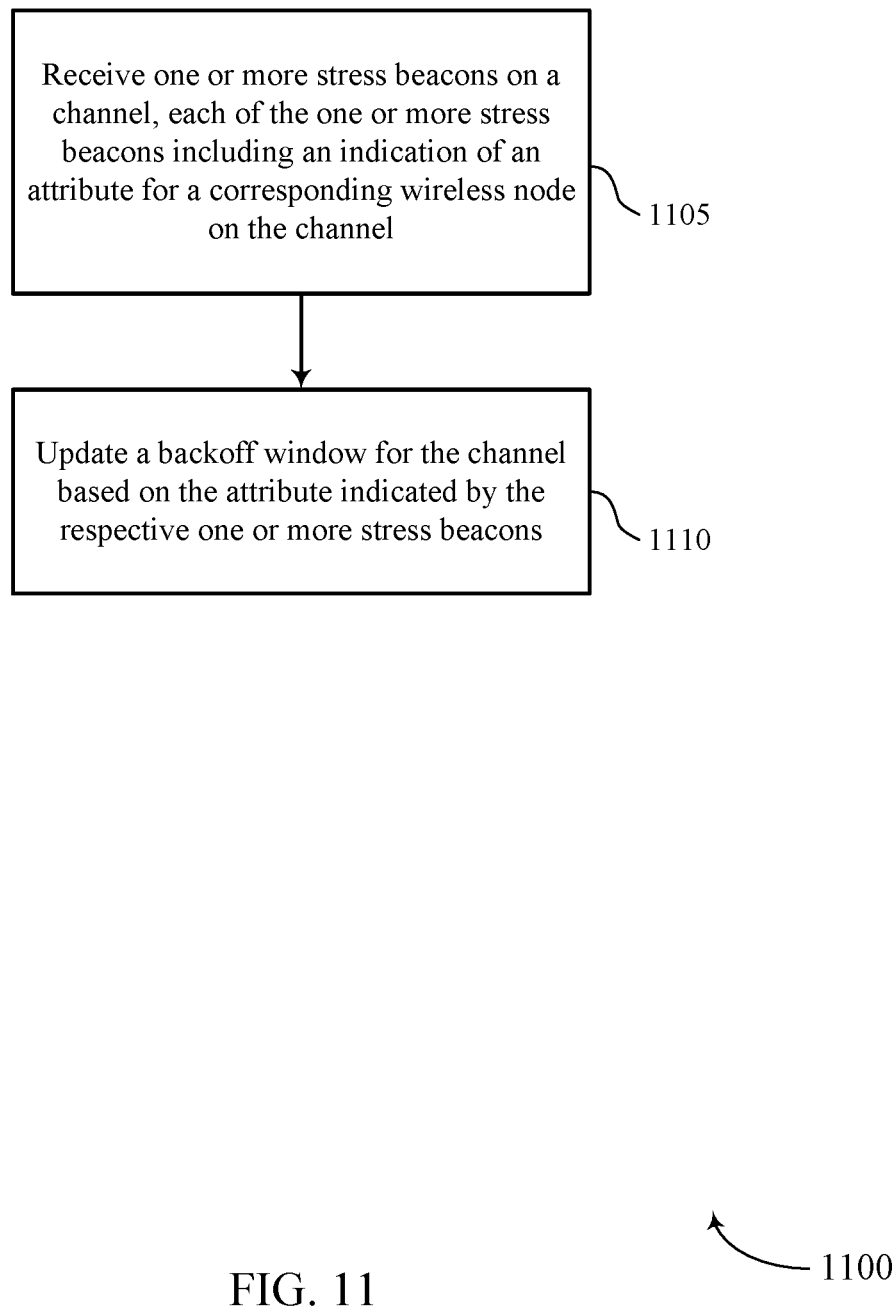
FIGS. 11 through 13 illustrate methods for NR LBT procedures for spectrum sharing, in accordance with one or more aspects of the present disclosure.

FIG. 11 shows a flowchart illustrating a method 1100 for NR LBT for spectrum sharing, in accordance with one or more aspects of the present disclosure. The operations of method 1100 may be implemented by a UE 115 or base station 105, e.g., a wireless node, or its components as described herein. For example, the operations of method 1100 may be performed by a spectrum sharing manager as described with reference to FIGS. 6 through 8. In some examples, a UE 115 or base station 105 may execute a set of codes to control the functional elements of the device to perform the functions described below. Additionally or alternatively, the UE 115 or base station 105 may perform aspects of the functions described below using special-purpose hardware.

At block 1105 the UE 115 or base station 105 may receive one or more stress beacons on a channel, each of the one or more stress beacons comprising an indication of an attribute for a corresponding wireless node on the channel. The operations of block 1105 may be performed according to the methods described with reference to FIGS. 1 through 5. In certain examples, aspects of the operations of block 1105 may be performed by a stress beacon component as described with reference to FIGS. 6 through 8.

At block 1110 the UE 115 or base station 105 may update a backoff window for the channel based at least in part on the attribute(s) indicated by the respective one or more stress beacons. The operations of block 1110 may be performed according to the methods described with reference to FIGS. 1 through 5. In certain examples, aspects of the operations of block 1110 may be performed by a backoff window component as described with reference to FIGS. 6 through 8.

Figure 12:
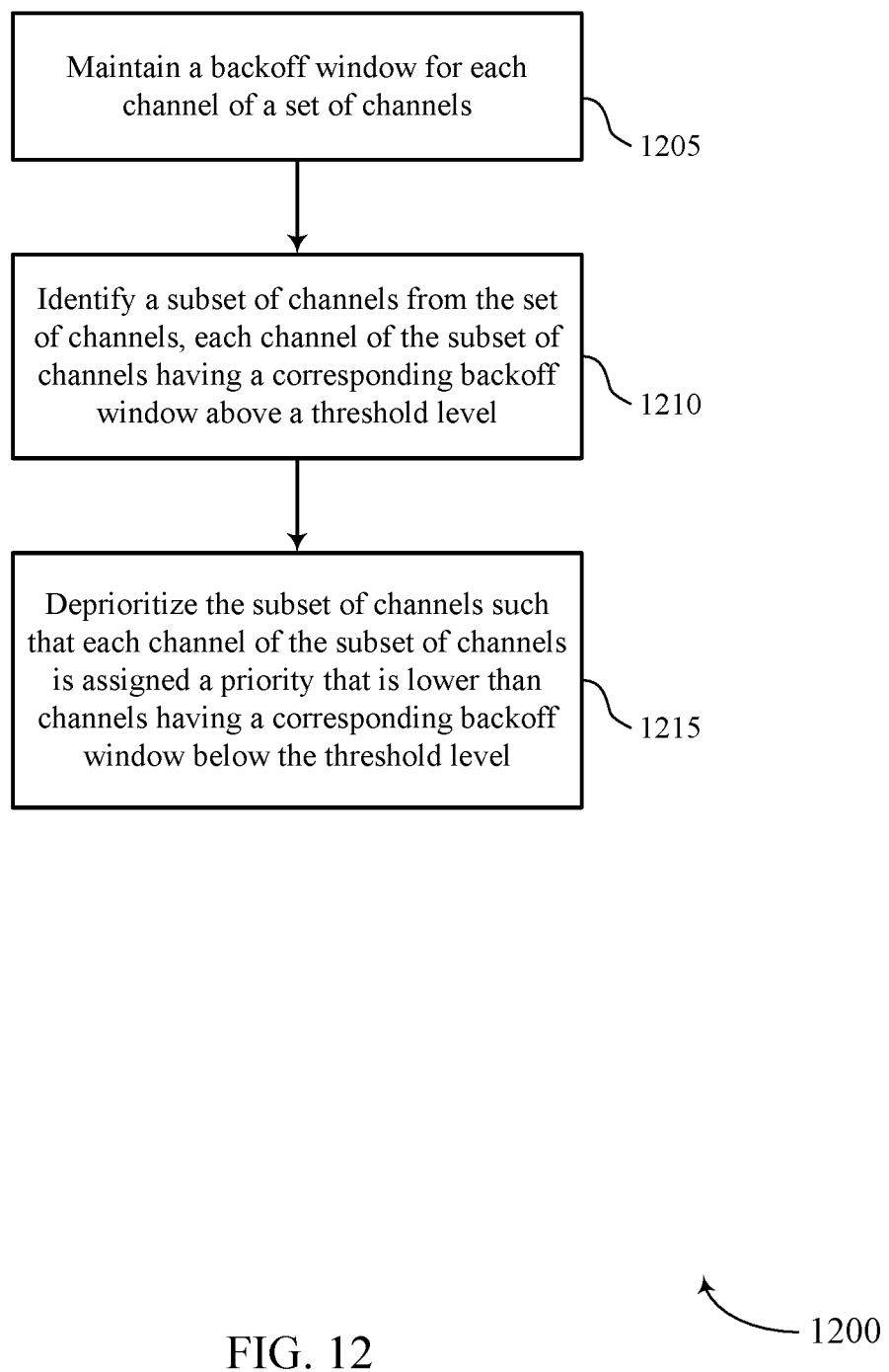

FIG. 12 shows a flowchart illustrating a method 1200 for NR LBT for spectrum sharing in accordance with various aspects of the present disclosure. The operations of method 1200 may be implemented by a UE 115 or base station 105, e.g., a wireless node, or its components as described herein. For example, the operations of method 1200 may be performed by a spectrum sharing manager as described with reference to FIGS. 6 through 8. In some examples, a UE 115 or base station 105 may execute a set of codes to control the functional elements of the device to perform the functions described below. Additionally or alternatively, the UE 115 or base station 105 may perform aspects of the functions described below using special-purpose hardware.

At block 1205 the UE 115 or base station 105 may maintain a backoff window for each channel of a set of channels. The operations of block 1205 may be performed according to the methods described with reference to FIGS. 1 through 5. In certain examples, aspects of the operations of block 1205 may be performed by a backoff window component as described with reference to FIGS. 6 through 8.

At block 1210 the UE 115 or base station 105 may identify a subset of channels from the set of channels, each channel of the subset of channels having a corresponding backoff window above a threshold level. The operations of block 1210 may be performed according to the methods described with reference to FIGS. 1 through 5. In certain examples, aspects of the operations of block 1210 may be performed by a channel priority component as described with reference to FIGS. 6 through 8.

At block 1215 the UE 115 or base station 105 may deprioritize the subset of channels such that each channel of the subset of channels is assigned a priority that is lower than channels having a corresponding backoff window below the threshold level. The operations of block 1215 may be performed according to the methods described with reference to FIGS. 1 through 5. In certain examples, aspects of the operations of block 1215 may be performed by a channel priority component as described with reference to FIGS. 6 through 8.

Figure 13:
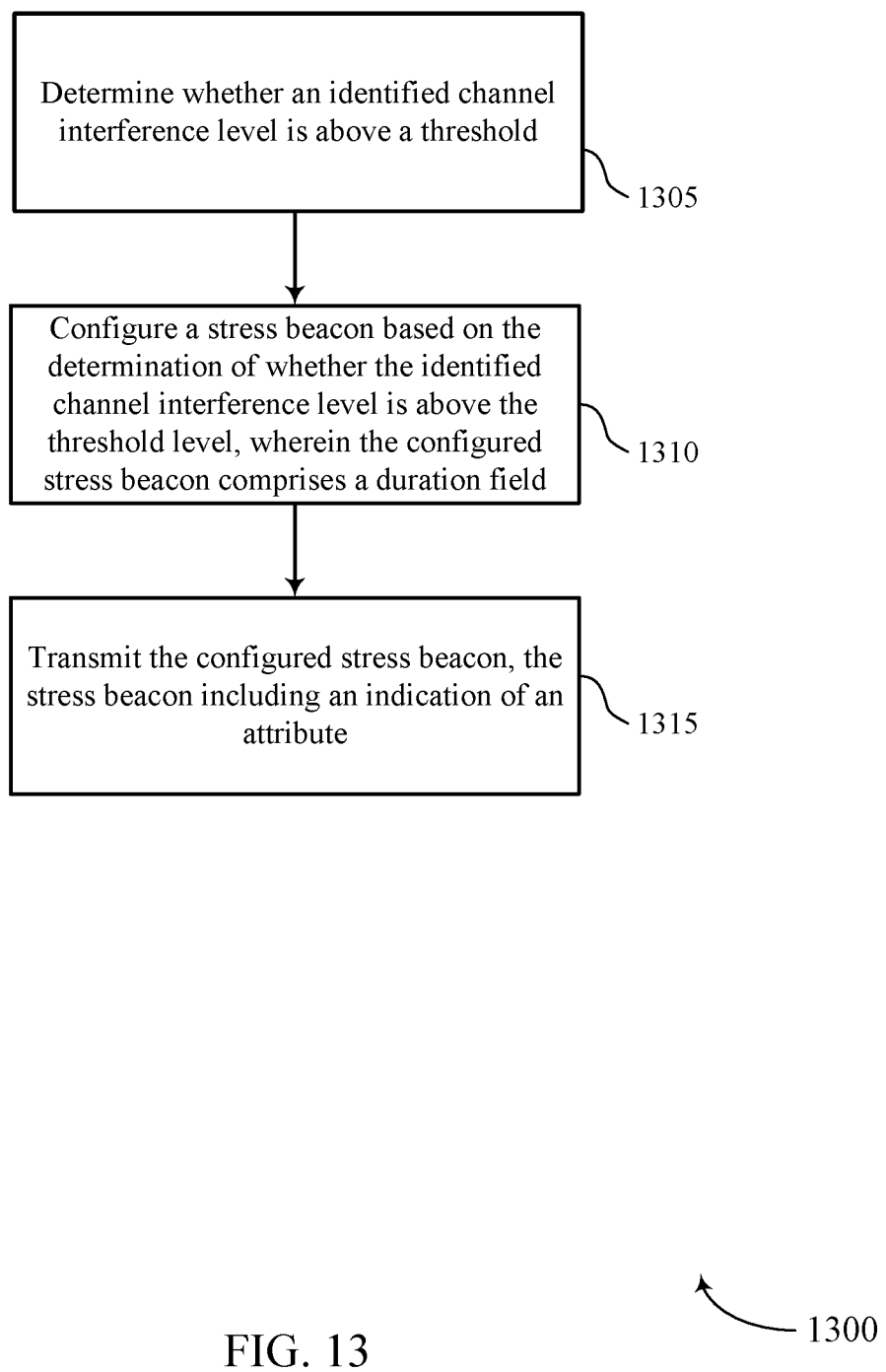

FIG. 13 shows a flowchart illustrating a method 1300 for NR LBT for spectrum sharing in accordance with various aspects of the present disclosure. The operations of method 1300 may be implemented by a UE 115 or base station 105, e.g., wireless node, or its components as described herein. For example, the operations of method 1300 may be performed by a spectrum sharing manager as described with reference to FIGS. 6 through 8. In some examples, a UE 115 or base station 105 may execute a set of codes to control the functional elements of the device to perform the functions described below. Additionally or alternatively, the UE 115 or base station 105 may perform aspects of the functions described below using special-purpose hardware.

At block 1305 the UE 115 or base station 105 may determine whether an identified channel interference level is above a threshold. The operations of block 1305 may be performed according to the methods described with reference to FIGS. 1 through 5. In certain examples, aspects of the operations of block 1305 may be performed by an interference component as described with reference to FIGS. 6 through 8.

At block 1310 the UE 115 or base station 105 may configure a stress beacon based at least in part on the determination of whether the identified channel interference level is above the threshold level, wherein the configured stress beacon comprises a duration field. The operations of block 1310 may be performed according to the methods described with reference to FIGS. 1 through 5. In certain examples, aspects of the operations of block 1310 may be performed by a stress beacon component as described with reference to FIGS. 6 through 8.

At block 1315 the UE 115 or base station 105 may transmit the configured stress beacon, the stress beacon comprising an indication of an attribute. The operations of block 1315 may be performed according to the methods described with reference to FIGS. 1 through 5. In certain examples, aspects of the operations of block 1315 may be performed by a stress beacon component as described with reference to FIGS. 6 through 8.

It should be noted that the methods described above describe possible implementations, and that the operations may be rearranged or otherwise modified and that other implementations are possible. Furthermore, aspects from two or more of the methods may be combined.

Techniques described herein may be used for various wireless communication systems such as CDMA, TDMA, FDMA, OFDMA, single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP LTE and LTE-Advanced (LTE-A) are releases of UMTS that use E-UTRA. UTRA, E-UTRA, UMTS, LTE, LTE-A, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects an LTE system may be described for purposes of example, and LTE terminology may be used in much of the description, the techniques described herein are applicable beyond LTE applications.

In LTE/LTE-A networks, including such networks described herein, the term eNB may be generally used to describe the base stations. The wireless communication system or systems described herein may include a heterogeneous LTE/LTE-A network in which different types of eNBs provide coverage for various geographical regions. For example, each eNB or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNB, Home NodeB, a Home eNodeB, or some other suitable terminology. The geographic coverage area for a base station may be divided into sectors making up only a portion of the coverage area. The wireless communication system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers). A gNB for a macro cell may be referred to as a macro gNB. A gNB for a small cell may be referred to as a small cell gNB, a pico gNB, a femto gNB, or a home gNB. A gNB may support one or multiple (e.g., two, three, four, and the like) cells (e.g., component carriers). A UE may be able to communicate with various types of base stations and network equipment including macro eNBs, small cell eNBs, relay base stations, and the like.

The wireless communication system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communication system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary operation that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   receiving one or more stress beacons on a channel, each of the one or more stress beacons comprising an indication of one or more attributes for a corresponding wireless node on the channel, the one or more attributes comprising a determined allowable interference level;
   updating a backoff window for the channel based at least in part on the one or more attributes indicated by the respective one or more stress beacons;
   identifying a backoff transmit power level based at least in part on the allowable interference level indicated by the respective one or more stress beacons; and
   adjusting a transmit power based at least in part on the backoff transmit power level.

2. The method of claim 1, further comprising:
   updating the backoff window for the channel based at least in part on one or more of an acknowledgement/negative-acknowledgement (ACK/NACK) feedback message, a channel quality information (CQI) feedback message, a measurement report provided by a network listen module, or combinations thereof.

3. The method of claim 1, further comprising:
   identifying a pathloss value associated with the respective one or more stress beacons; and
   identifying the backoff transmit power level based at least in part on the pathloss value.

4. The method of claim 1, further comprising:
   determining that the backoff transmit power level is above a threshold level; and
   utilizing a time division multiplexing scheme for subsequent transmissions.

5. The method of claim 1, further comprising:
   identifying a stress beacon count indicative of a number of the one or more stress beacons received on the channel; and
   updating the backoff window based at least in part on the stress beacon count.

6. The method of claim 1, wherein the one or more attributes indicated by the one or more stress beacons are associated with one or more prior transmissions.

7. The method of claim 1, further comprising:
   identifying a total network count associated with one or more detected networks; and
   updating the backoff window based at least in part on the total network count.

8. The method of claim 1, further comprising:
   receiving a subsequent stress beacon during a backoff window period;
   pausing the backoff window;
   updating the backoff window based at least in part on the indication in the subsequent stress beacon of the one or more attributes for the corresponding wireless node; and
   resuming the backoff window period according to the updated backoff window.

9. The method of claim 1, further comprising:
   determining, based at least in part on the backoff window, whether to perform one or more of a power backoff operation, a transmission blanking procedure, or a beamforming transmission.

10. The method of claim 1, further comprising:
    transmitting a trigger message to initiate receipt of the one or more stress beacons.

11. The method of claim 10, wherein the trigger message comprises an enhanced request to send (eRTS) message.

12. The method of claim 1, wherein the one or more stress beacons comprise an enhanced clear to send (eCTS) message.

13. An apparatus for wireless communication, comprising:
    a processor;
    memory in electronic communication with the processor; and
    instructions stored in the memory and operable, when executed by the processor, to cause the apparatus to:
      receive one or more stress beacons on a channel, each of the one or more stress beacons comprising an indication of one or more attributes for a corresponding wireless node on the channel, the one or more attributes comprising a determined allowable interference level;
      update a backoff window for the channel based at least in part on the one or more attributes indicated by the respective one or more stress beacons;
      identify a backoff transmit power level based at least in part on the allowable interference level indicated by the respective one or more stress beacons; and
      adjust a transmit power based at least in part on the backoff transmit power level.

14. The apparatus of claim 13, wherein the instructions are executable by the processor to:
    update the backoff window for the channel based at least in part on one or more of an acknowledgement/negative-acknowledgement (ACK/NACK) feedback message, a channel quality information (CQI) feedback message, a measurement report provided by a network listen module, or combinations thereof.

15. The apparatus of claim 13, wherein the instructions are executable by the processor to:
    identify a pathloss value associated with the respective one or more stress beacons; and
    identify the backoff transmit power level based at least in part on the pathloss value.

16. The apparatus of claim 13, wherein the instructions are executable by the processor to:
    determine that the backoff transmit power level is above a threshold level; and
    utilize a time division multiplexing scheme for subsequent transmissions.

17. The apparatus of claim 13, wherein the instructions are executable by the processor to:
    identify a stress beacon count indicative of a number of the one or more stress beacons received on the channel; and
    update the backoff window based at least in part on the stress beacon count.

18. The apparatus of claim 13, wherein the one or more attributes indicated by the one or more stress beacons are associated with one or more prior transmissions.

19. The apparatus of claim 13, wherein the instructions are executable by the processor to:
    identify a total network count associated with one or more detected networks; and
    update the backoff window based at least in part on the total network count.

20. The apparatus of claim 13, wherein the instructions are executable by the processor to:
    receive a subsequent stress beacon during a backoff window period;
    pause the backoff window;

update the backoff window based at least in part on the indication in the subsequent stress beacon of the one or more attributes for the corresponding wireless node; and resume the backoff window period according to the updated backoff window.

21. The apparatus of claim 13, wherein the instructions are executable by the processor to:

determine, based at least in part on the backoff window, whether to perform one or more of a power backoff operation, a transmission blanking procedure, or a beamforming transmission.

22. The apparatus of claim 13, wherein the instructions are executable by the processor to:

transmit a trigger message to initiate receipt of the one or more stress beacons.

23. The apparatus of claim 22, wherein the trigger message comprises an enhanced request to send (eRTS) message.

24. The apparatus of claim 13, wherein the one or more stress beacons comprise an enhanced clear to send (eCTS) message.

\* \* \* \* \*